United States Patent
Kim et al.

(10) Patent No.: US 10,321,274 B2
(45) Date of Patent: Jun. 11, 2019

(54) APPARATUS AND METHOD FOR DETERMINING LOCATION OF ELECTRONIC DEVICE

(71) Applicant: SAMSUNG ELECTRONICS CO., LTD., Suwon-si, Gyeonggi-do (KR)

(72) Inventors: Jin-Woo Kim, Seoul (KR); Hye-Joong Kang, Suwon-si (KR); Chae-Man Lim, Seoul (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 2 days.

(21) Appl. No.: 15/416,363

(22) Filed: Jan. 26, 2017

(65) Prior Publication Data

US 2017/0223506 A1   Aug. 3, 2017

(30) Foreign Application Priority Data

Jan. 29, 2016   (KR) ........................ 10-2016-0011995

(51) Int. Cl.
| | |
|---|---|
| *H04W 4/00* | (2018.01) |
| *H04W 4/029* | (2018.01) |
| *H04W 64/00* | (2009.01) |
| *H04W 4/02* | (2018.01) |
| *H04W 24/02* | (2009.01) |

(52) U.S. Cl.
CPC .......... *H04W 4/029* (2018.02); *H04W 4/025* (2013.01); *H04W 64/00* (2013.01); *H04W 24/02* (2013.01)

(58) Field of Classification Search
CPC ... H04W 64/00; H04W 64/003; H04W 4/025; H04W 88/08; H04W 36/0083; H04W 4/027; H04W 4/029; H04W 4/90; H04W 72/04; H04W 72/042; H04W 84/045
USPC ......... 455/456.1, 456.3, 456.2, 456.6, 404.2, 455/446, 450, 452.1, 456.5, 552.1
See application file for complete search history.

(56) References Cited

U.S. PATENT DOCUMENTS

| | | | |
|---|---|---|---|
| 6,433,735 B1 | 8/2002 | Bloebaum et al. | |
| 2009/0082032 A1* | 3/2009 | Selgert | H04W 8/10 455/456.1 |
| 2011/0190000 A1 | 8/2011 | Kwun | |
| 2012/0190380 A1* | 7/2012 | Dupray | G01S 1/026 455/456.1 |
| 2012/0224484 A1* | 9/2012 | Babiarz | H04L 41/5019 370/235 |

(Continued)

FOREIGN PATENT DOCUMENTS

| | | |
|---|---|---|
| KR | 10-2011-0089691 | 8/2011 |
| WO | 2013/177449 | 11/2013 |

OTHER PUBLICATIONS

Search Report and Written Opinion dated Apr. 26, 2017 in counterpart International Patent Application No. PCT/KR2017/000956.

*Primary Examiner* — Fred A Casca
(74) *Attorney, Agent, or Firm* — Nixon & Vanderhye P.C.

(57) ABSTRACT

Provided is an apparatus and method for providing a location of an electronic device according to various embodiments. An operation method of the electronic device according to an embodiment includes obtaining cellular data from at least one base station, obtaining at least one coverage information corresponding to the obtained cellular data, and determining a location of the electronic device based on the obtained at least one coverage information.

9 Claims, 25 Drawing Sheets

(56) References Cited

U.S. PATENT DOCUMENTS

| | | | |
|---|---|---|---|
| 2012/0329476 A1 | 12/2012 | Tenny | |
| 2013/0260771 A1* | 10/2013 | Wirola | G01S 5/0252 |
| | | | 455/446 |
| 2014/0179332 A1* | 6/2014 | Qian | H04W 72/1231 |
| | | | 455/452.1 |
| 2015/0045061 A1 | 2/2015 | Da | |
| 2015/0223189 A1* | 8/2015 | Le Grand | H04W 64/003 |
| | | | 455/456.3 |
| 2015/0365789 A1* | 12/2015 | Salot | H04W 4/02 |
| | | | 455/456.1 |
| 2017/0026929 A1* | 1/2017 | Grischy | H04W 24/04 |

* cited by examiner

APPARATUS AND METHOD FOR DETERMINING LOCATION OF ELECTRONIC DEVICE

CROSS-REFERENCE TO RELATED APPLICATION

This application is based on and claims priority under 35 U.S.C. § 119 to a Korean patent application filed in the Korean Intellectual Property Office on Jan. 29, 2016 and assigned Serial No. 10-2016-0011995, the disclosure of which is incorporated by reference herein in its entirety.

TECHNICAL FIELD

The present disclosure relates generally to an electronic device for determining a location and an operation method of the electronic device.

BACKGROUND

With the development of mobile communication technologies, electronic devices perform various data communication functions through wired/wireless networks as well as a voice communication function. The electronic devices may provide various functions as applications obtained through the wired/wireless networks are executed. For example, the electronic device may provide a location-based service by using an application using location information of the electronic device.

The electronic device may obtain location information of the electronic device from a satellite positioning device (e.g., a global positioning system (GPS) satellite) that provides location information. The location information of the electronic device may include, for example, a latitude and a longitude in a location, and may be used as a parameter of the location-based service. The electronic device may estimate a location of the electronic device by using location information of a base station or a relay device communicating with the electronic device.

The electronic device recognizes the location of the electronic device by using a GPS satellite. However, if a GPS signal transmitted from the GPS satellite is disturbed or fails to be received, the electronic device may not determine a correct location by using the GPS signal. A location estimation scheme using a location of the base station or the relay device communicating with the electronic device estimates a location of a transmission point at which a signal is transmitted as the location of the electronic device, resulting in an error of several kilometers at most from the correct location.

Moreover, a scheme to estimate a distance by using a radio channel gain at the transmission point at which the electronic device communicates a signal is also used, but the radio channel gain has a problem of a different estimated distance according to surrounding geographical features or obstacles or signal reception performance of the electronic device.

SUMMARY

Various example embodiments of the present disclosure provide a method and apparatus for determining a location of an electronic device using cellular network information if the electronic device fails to receive a signal for determining a correct location, such as a GPS signal, from a GPS satellite.

Various example embodiments of the present disclosure collect location collection data for obtained location information and cellular information to generate a radio map for determining a location based on the cellular information.

Various example embodiments of the present disclosure determine a location of an electronic device based on a moving coverage based on coverage information and mobility of a serving cell and a neighboring cell.

Various example embodiments of the present disclosure provide a method for determining a location in an electronic device, and the electronic device.

According to an example aspect of the present disclosure, a method in an electronic device is provided, the method including obtaining cellular data from at least one base station, obtaining at least one coverage information corresponding to the obtained cellular data, and determining a location of the electronic device based on the obtained at least one coverage information.

According to another example aspect of the present disclosure, an electronic device is provided, the electronic device including a cellular module comprising cellular communication circuitry configured to obtain cellular data from at least one base station, a memory, and a processor electrically connected with the memory, in which the memory stores instructions which, when executed cause the processor to obtain at least one coverage information corresponding to the obtained cellular data and to determine a location of the electronic device based on the obtained at least one coverage information.

According to another example aspect of the present disclosure, a portable electronic device is provided, the portable electronic device including a communication interface comprising communication circuitry and a processor configured to identify first cell information corresponding to a serving cell for the portable electronic device and second cell information corresponding to a neighboring cell for the portable electronic device, to transmit the first cell information to an external electronic device using the communication circuitry of the communication interface, to receive first coverage information corresponding to the first cell information, the first coverage information being determined at least based on the first cell information, and to receive second coverage information corresponding to the second cell information from the external electronic device, and to determine location information corresponding to the portable electronic device at least based on the first coverage information and the second coverage information.

Other aspects, advantages, and salient features of the disclosure will become apparent to those skilled in the art from the following detailed description, which, taken in conjunction with the annexed drawings, discloses example embodiments of the disclosure.

BRIEF DESCRIPTION OF THE DRAWINGS

The above and other aspects, features and attendant advantages of the present disclosure will be more apparent and more readily understood from the following detailed description, taken in conjunction with the accompanying drawings, in which like reference numerals refer to like elements, and wherein.

DETAILED DESCRIPTION

Figure 1:
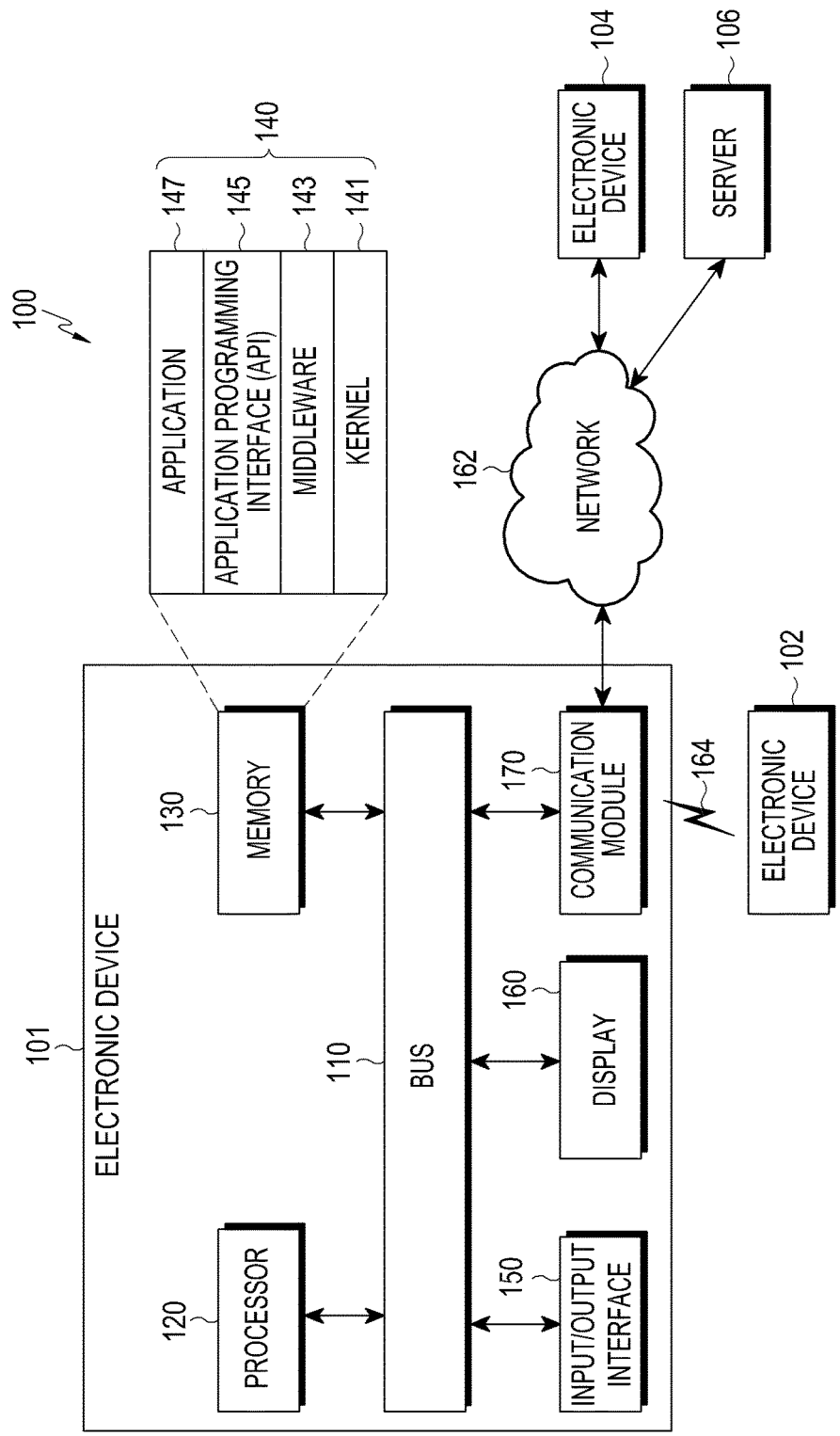
FIG. 1 is a block diagram illustrating an example electronic device in a network environment according to various example embodiments of the present disclosure.

Hereinafter, various example embodiments of the present disclosure will be disclosed and described with reference to the accompanying drawings. However, the description is not intended to limit the present disclosure to particular embodiments, and it should be understood as including various modifications, equivalents, and/or alternatives of the example embodiments of the present disclosure. In regard to the description of the drawings, like reference numerals refer to like elements.

In the present disclosure, an expression such as "having," "may have," "comprising," or "may comprise" indicates existence of a corresponding characteristic (e.g., a numerical value, a function, an operation, or an element like a part) and does not exclude existence of additional characteristic.

In the present disclosure, an expression such as "A or B," "at least one of A or/and B," or "one or more of A or/and B" may include all possible combinations of together listed items. For example, "A or B," "at least one of A and B," or "one or more of A or B" may indicate the entire of (1) including at least one A, (2) including at least one B, or (3) including both at least one A and at least one B.

Expressions such as "first," "second," "primarily," or "secondary," used herein may represent various elements regardless of order and/or importance and do not limit corresponding elements. For example, a first user device and a second user device may represent different user devices regardless of order or importance. For example, a first element may be named as a second element without departing from the right scope of the various example embodiments of the present disclosure, and similarly, a second element may be named as a first element.

When it is described that an element (such as a first element) is "operatively or communicatively coupled with/ to" or "connected" to another element (such as a second element), the element can be directly connected to the other element or can be connected to the other element through another element (e.g., a third element). However, when it is described that an element (such as a first element) is "directly connected" or "directly coupled" to another element (such as a second element), there is no intermediate element (such as a third element) between the element and the other element.

An expression "configured to (or set)" used in the present disclosure may be replaced with, for example, "suitable for," "having the capacity to," "designed to," "adapted to," "made to," or "capable of" according to a situation. A term "configured to (or set)" does not always refer only to "specifically designed to" by hardware. In some situations, an expression "apparatus configured to" may refer to a situation in which the apparatus "can" operate together with another apparatus or component. For example, a phrase "a processor configured (or set) to perform A, B, and C" may, for example, refer to a dedicated processor (e.g., an embedded processor) for performing a corresponding operation or a generic-purpose processor (such as a CPU or an application processor) that can perform a corresponding operation by executing at least one software program stored at a memory device.

Terms defined in the present disclosure are used for only describing a various example embodiments and does not have an intention to limit the scope of other example embodiments. The singular forms are intended to include the plural forms as well, unless the context clearly indicates otherwise. All of the terms used herein including technical or scientific terms have the same meanings as those generally understood by an ordinary skilled person in the related art. The terms defined in a generally used dictionary should be interpreted as having meanings that are the same as or similar with the contextual meanings of the relevant technology and should not be interpreted as having ideal or exaggerated meanings unless they are clearly defined in the various example embodiments. In some cases, even when terms are defined in the present disclosure should not be construed to exclude the example embodiments.

An electronic device according to various example embodiments of the present disclosure may include at least one of, for example, a smartphone, a tablet personal computer (PC), a mobile phone, a video phone, an electronic-book (e-book) reader, a desktop PC, a laptop PC, a netbook computer, a workstation, a server, a personal digital assistant (PDA), a portable multimedia player (PMP), an MP3 player, a mobile medical equipment, a camera, and a wearable device, or the like, but is not limited thereto. According to various example embodiments, examples of the wearable device may include at least one of an accessory type (e.g., a watch, a ring, a bracelet, an anklet, a necklace, glasses, contact lenses, head-mounted device (HMD), etc.), a fabric or cloth-integrated type (e.g., electronic clothing, etc.), a body-attached type (e.g., a skin pad, a tattoo, etc.), a body implanted type (e.g., an implantable circuit, etc.), or the like, but is not limited thereto.

According to some example embodiments, the electronic device may be a home appliance. The home appliance may include, for example, a television (TV), a digital video disk (DVD) player, audio equipment, a refrigerator, an air conditioner, a vacuum cleaner, an oven, a microwave oven, a laundry machine, an air cleaner, a set-top box, a home automation control panel, a security control panel, a TV box (e.g., HomeSync™ of Samsung, Apple TV™ or GoogleTV™), a game console, an electronic dictionary, an electronic key, a camcorder, and an electronic frame, or the like, but is not limited thereto.

According to other example embodiments of the present disclosure, the electronic device may include at least one of various medical equipment (for example, magnetic resonance angiography (MRA), magnetic resonance imaging (MRI), computed tomography (CT), an imaging device, or an ultrasonic device), a navigation system, a global positioning system (GPS) receiver, an event data recorder (EDR), a flight data recorder (FDR), a vehicle information device, electronic equipment for ships (e.g., a navigation system and gyro compass for ships), avionics, a security device, a vehicle head unit, an industrial or home robot, an automatic teller's machine (ATM), a Point of Sales (POS), Internet of things (e.g., electric bulbs, various sensors, electricity or gas meters, sprinkler devices, fire alarm devices, thermostats, streetlights, toasters, exercise machines, hot-water tanks, heaters, boilers, and so forth), or the like, but is not limited thereto.

According to some example embodiments, the electronic device may include a part of a furniture or building/structure, an electronic board, an electronic signature receiving device, a projector, and various measuring instruments (e.g., a water, electricity, gas, electric wave measuring device, etc.), or the like, but is not limited thereto. The electronic device according to various example embodiments of the present disclosure may be one of the above-listed devices or a combination thereof. The electronic device according to some example embodiments may be a flexible electronic device. The electronic device according to various example embodiments of the present disclosure is not limited to the above-listed devices and may include new electronic devices according to technical development.

Hereinafter, an electronic device according to various example embodiments of the present disclosure will be described with reference to the accompanying drawings. Herein, the term "user" used in various embodiments of the present disclosure may refer to a person who uses the electronic device or a device using the electronic device.

Referring to FIG. 1, an electronic device 101 in a network environment 100 according to various example embodiments of the present disclosure is disclosed. The electronic device 101 may include a bus 110, a processor (e.g., including processing circuitry) 120, a memory 130, an input/output (I/O) interface (e.g., including I/O circuitry) 150, a display 160, and a communication module (e.g., including communication circuitry) 170 (also referred to as a communication interface). According to some example embodiments, the electronic device 101 may omit at least one of the foregoing elements or may further include other elements.

The bus 110 may include a circuit for connecting, e.g., the elements 110 to 170 and delivering communication (e.g., a control message and/or data) between the elements 110 to 170.

The processor 120 may include various processing circuitry, such as, for example, and without limitation, one or more of a dedicated processor, a central processing unit (CPU), an application processor (AP), and a communication processor (CP). The processor 120 performs operations or data processing for control and/or communication of, for example, at least one other elements of the electronic device 101.

The memory 130 may include a volatile and/or nonvolatile memory. The memory 130 may store, for example, commands or data associated with at least one other elements of the electronic device 101. According to an example embodiment of the present disclosure, the memory 130 may store software and/or a program 140. The program 140 may include at least one of, for example, a kernel 141, middleware 143, an application programming interface (API) 145, and/or an application program (or "application") 147, and the like. At least some of the kernel 141, the middleware 143, and the API 145 may be referred to as an operating system (OS).

The kernel 141 may control or manage, for example, system resources (e.g., the bus 110, the processor 120, the memory 130, etc.) used to execute operations or functions implemented in other programs (e.g., the middleware 143, the API 145, or the application program 147). The kernel 141 provides an interface through which the middleware 143, the API 145, or the application program 147 accesses separate components of the electronic device 101 to control or manage the system resources.

The middleware 143 may work as an intermediary for allowing, for example, the API 145 or the application program 147 to exchange data in communication with the kernel 141.

In addition, the middleware 143 may process one or more task requests received from the application program 147 based on priorities. For example, the middleware 143 may give a priority for using a system resource (e.g., the bus 110, the processor 120, the memory 130, etc.) of the electronic device 101 to at least one of the application programs 147. For example, the middleware 143 may perform scheduling or load balancing with respect to the one or more task requests by processing the one or more task requests based on the priority given to the at least one of the application programs 147.

The API 145 is an interface used for the application 147 to control a function provided by the kernel 141 or the middleware 143, and may include, for example, at least one interface or function (e.g., a command) for file control, window control, image processing or character control.

The I/O interface 150 may include various I/O circuitry and serves as an interface for delivering, for example, a command or data input from a user or another external device to other component(s) of the electronic device 101. The I/O interface 150 may also output a command or data received from other component(s) of the electronic device 101 to a user or another external device.

The display 160 may include, for example, a liquid crystal display (LCD), a light emitting diode (LED) display, an organic light emitting diode (OLED) display, a microelectromechanical system (MEMS) display, or an electronic paper display, or the like, but is not limited thereto. The display 160 may, for example, display various contents (e.g., a text, an image, video, an icon, a symbol, etc.) to users. The display 160 may include a touch screen, and receives a touch, a gesture, proximity, or a hovering input, for example, by using an electronic pen or a part of a body of a user.

The communication module 170 may include various communication circuitry and establishes communication between the electronic device 101 and an external device (e.g., a first external electronic device 102, a second external electronic device 104, or a server 106). For example, the communication module 170 may be connected to a network 162 through wireless communication or wired communication to communicate with an external device (e.g., the second external electronic device 104 or the server 106).

The wireless communication may use, as a cellular communication protocol, for example, at least one of Long Term Evolution (LTE), LTE-Advanced (LTE-A), Code Division Multiple Access (CDMA), Wideband CDMA (WCDMA), a Universal Mobile Telecommunication System (UMTS), Wireless Broadband (WiBro), or Global System for Mobile Communications (GSM)). The wired communication may include, for example, short-range communication 164. The short-range communication 164 may include, for example, at least one of WiFi, Bluetooth, NFC, and GNSS. Depending on a usage area or bandwidth, the GNSS may include, for example, at least one of a global positioning system (GPS), a global navigation satellite system (Glonass), a Beidou navigation satellite system ("Beidou"), and Galileo, the European global satellite-based navigation system. Hereinbelow, "GPS" may be used interchangeably with "GNSS". The wired communication may include, for example, at least one of a universal serial bus (USB), a high definition multimedia interface (HDMI), RS-232, and POTS. The network 162 may include a telecommunications network, for example, at least one of a computer network (e.g., a local area network (LAN) or a wide area network (WAN)), Internet, and a telephone network.

Each of the first external electronic device 102 and the second external electronic device 104 may be a device of the same type as or a different type than the electronic device 101. According to an example embodiment of the present disclosure, the server 106 may include a group of one or more servers. According to various example embodiments of the present disclosure, some or all of operations performed by the electronic device 101 may be performed in another electronic device or a plurality of electronic devices (e.g., the electronic device 102 or 104, or the server 106). According to an example embodiment of the present disclosure, when the electronic device 101 has to perform a function or a service automatically or at a request, the electronic device 101 may request another device (e.g., the electronic devices 102 or 104 or the server 106) to perform at least some functions associated with the function or the service instead of or in addition to executing the function or the service. The other electronic device (e.g., the electronic device 102 or 104 or the server 106) may execute the requested function or additional function and deliver the execution result to the electronic device 101. The electronic device 101 may then process or further process the received result to provide the requested function or service. To this end, for example, cloud computing, distributed computing, or client-server computing may be used.

Figure 2:
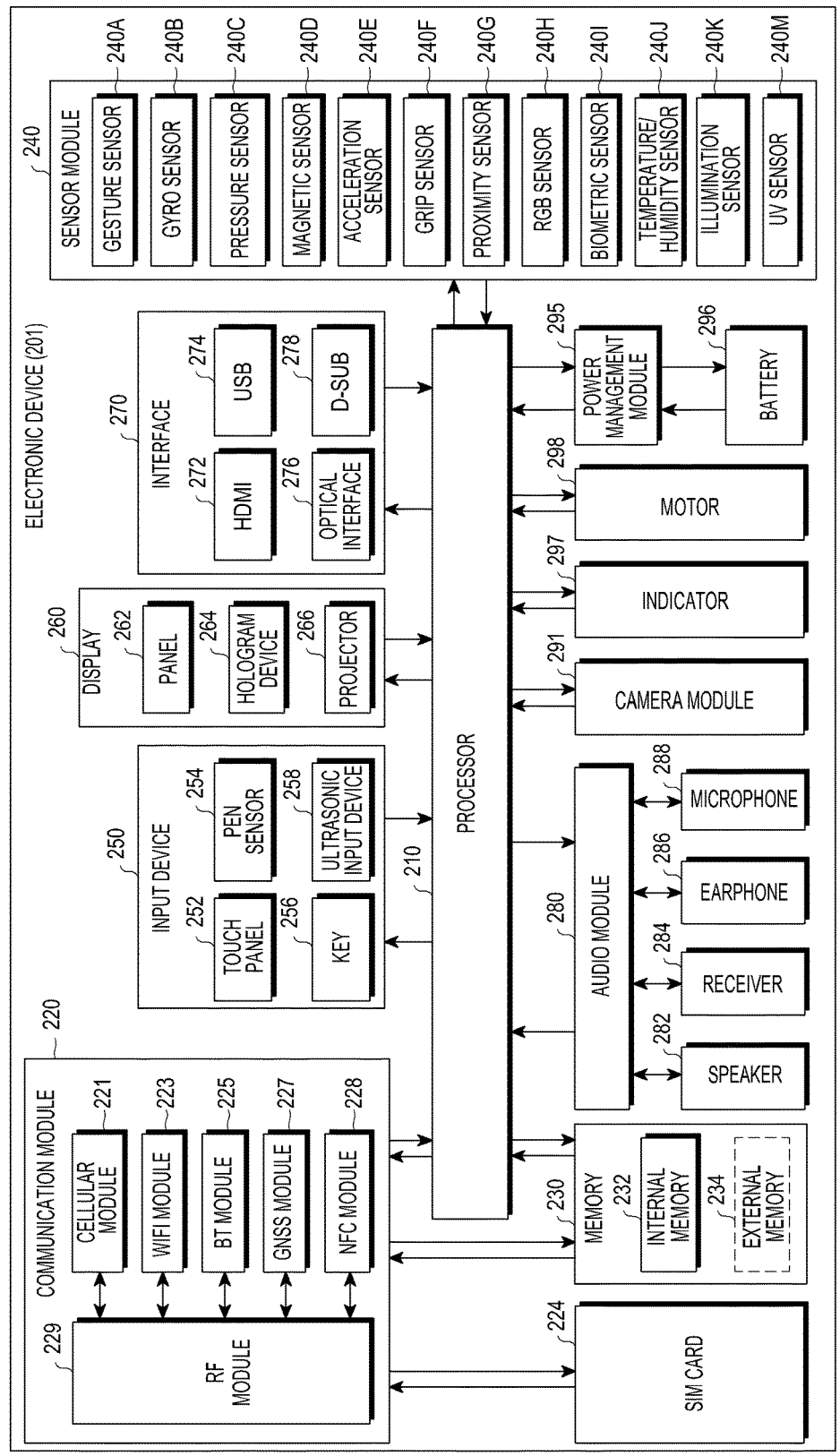
FIG. 2 is a block diagram illustrating an example electronic device according to various example embodiments of the present disclosure.

FIG. 2 is a block diagram illustrating an example electronic device 201 according to various example embodiments of the present disclosure. The electronic device 201 may form the entire electronic device 101 illustrated in FIG. 1 or a part of the electronic device 101 illustrated in FIG. 1. The electronic device 201 may include one or more processors (e.g., application processors (APs)) (e.g., including processing circuitry) 210, a communication module (e.g., including communication circuitry) 220, a subscriber identification module (SIM) 224, a memory 230, a sensor module 240, an input device (e.g., including input circuitry) 250, a display 260, an interface (e.g., including interface circuitry) 270, an audio module 280, a camera module 291, a power management module 295, a battery 296, an indicator 297, and a motor 298.

The processor 210 may control multiple hardware or software components connected to the processor 210 by driving an Operating System (OS) or an application program, and performs processing and operations with respect to various data. The processor 210 may be implemented with, for example, a system on chip (SoC). According to an embodiment of the present disclosure, the server 210 may include a GPU and/or an image signal processor. The processor 210 may include at least some of the elements illustrated in FIG. 2 (e.g., the cellular module 221). The processor 210 loads a command or data received from at least one of other elements (e.g., a non-volatile memory) into a volatile memory to process the command or data, and stores various data in the non-volatile memory.

The communication module 220 may have a configuration that is the same as or similar to the communication module 170 illustrated in FIG. 1. The communication module 220 may include various communication circuitry, such as, for example, and without limitation, at least one of the cellular module 221, a WiFi module 223, a Bluetooth (BT) module 225, a GNSS module 227 (e.g., a GPS module, a Glonass module, a Beidou module, or a Galileo module), a near field communication (NFC) module 228, and a radio frequency (RF) module 229.

The cellular module 221 may provide, for example, a voice call, a video call, a text service, or an Internet service over a communication network. According to an example embodiment, the cellular module 221 identifies and authenticates the electronic device 201 in a communication network by using the SIM 224 (e.g., a SIM card). According to an example embodiment, the cellular module 221 performs at least one of functions that may be provided by the processor 210. According to an example embodiment, the cellular module 221 may include a communication processor (CP).

Each of the WiFi module 223, the BT module 225, the GNSS module 227, and the NFC module 228 may include, for example, a processor for processing data transmitted and received by a corresponding module. According to some embodiments, at least some (e.g., two or more) of the cellular module 221, the WiFi module 223, the BT module 225, the GNSS module 227, and the NFC module 228 may be included in one integrated chip (IC) or IC package.

The RF module 229 may, for example, transmit and receive a communication signal (e.g., an RF signal). The RF module 229 may include a transceiver, a power amp module (PAM), a frequency filter, a low noise amplifier (LNA), or an antenna. According to another embodiment, at least one of the cellular module 221, the WiFi module 223, the BT module 225, the GNSS module 227, and the NFC module 228 may transmit and receive an RF signal through the separate RF module.

The SIM 224 may, for example, include a card including an SIM and/or an embedded SIM, and may include unique identification information (e.g., an integrated circuit card identifier (ICCID) or subscriber information (e.g., an international mobile subscriber identity (IMSI)).

The memory 230 (e.g., the memory 130) may, for example, include an internal memory 232 and/or an external memory 234. The internal memory 232 ay, for example, include at least one of a volatile memory (e.g., dynamic random access memory (DRAM), static RAM (SRAM), synchronous dynamic RAM (SDRAM), etc.), and a non-volatile memory (e.g., one time programmable read only memory (OTPROM), programmable ROM (PROM), erasable and programmable ROM (EPROM), electrically erasable and programmable ROM (EEPROM), etc.), mask ROM, flash ROM, NAND flash memory, NOR flash memory, etc.), and a solid state drive (SSD).

The external memory 234 may further include flash drive, for example, compact flash (CF), secure digital (SD), micro-SD, mini-SD, extreme Digital (xD), a multi-media card (MMC), or a memory stick. The external memory 234 may be functionally and/or physically connected with the electronic device 201 through various interfaces.

The sensor module 240 measures physical quantity or senses an operation state of the electronic device 201 to convert the measured or sensed information into an electrical signal. The sensor module 240 may, for example, include at least one of a gesture sensor 240A, a gyro sensor 240B, a pressure sensor 240C, a magnetic sensor 240D, an acceleration sensor 240E, a grip sensor 240F, a proximity sensor 240G, a color sensor 240H (e.g., RGB sensor), a biometric sensor 240I, a temperature/humidity sensor 240J, an illumination sensor 240K, and a ultraviolet (UV) sensor 240M. Additionally or alternatively, the sensor module 240 may include an E-nose sensor (not shown), an electromyography (EMG) sensor (not shown), an electroencephalogram (EEG) sensor (not shown), an electrocardiogram (ECG) sensor (not shown), an infrared (IR) sensor, an iris sensor, and/or a fingerprint sensor. The sensor module 240 may further include a control circuit for controlling at least one sensor included therein. In some embodiment, the electronic device 201 may further include a processor configured to control the sensor module 240 as part of or separately from the processor 210, to control the sensor module 240 during a sleep state of the processor 210.

The input device 250 may include various input circuitry, such as, for example, and without limitation, a touch panel 252, a (digital) pen sensor 254, a key 256, or an ultrasonic input device 258. The touch panel 252 may use at least one of a capacitive type, a resistive type, an IR type, or an ultrasonic type. The touch panel 252 may further include a control circuit. The touch panel 252 may further include a tactile layer to provide tactile reaction to the user.

The (digital) pen sensor 254 may include a recognition sheet which is a part of the touch panel 252 or a separate recognition sheet. The key 256 may also include a physical button, an optical key, or a keypad. The ultrasonic input device 258 senses ultrasonic waves generated by an input means through a microphone (e.g., the microphone 288) and checks data corresponding to the sensed ultrasonic waves.

The display 260 (e.g., the display 160) may include a panel 262, a hologram device 264, or a projector 266. The panel 262 may have a configuration that is the same as or similar to the display 160 illustrated in FIG. 1. The panel 262 may be implemented to be flexible, transparent, or wearable. The panel 262 may be configured with the touch panel 252 in one module. According to an example embodiment, the panel 262 may include a pressure sensor (or a "force sensor", interchangeably used hereinafter) capable of measuring a strength of a pressure by a user's touch. The pressure sensor may be implemented integrally with the touch panel 252 or may be implemented as one or more sensors separate from the touch panel 252. The hologram device 264 shows a stereoscopic image in the air by using interference of light. The projector 266 displays an image onto an external screen through projection of light. The screen may be positioned inside or outside the electronic device 201. According to an embodiment, the display 260 may further include a control circuit for controlling the panel 262, the hologram device 264, or the projector 266.

According to an example embodiment, the interface 270 may include various interface circuitry, such as, for example, and without limitation, an HDMI 272, a USB 274, an optical communication 276, or a D-subminiature 278. The interface 270 may be included in the communication module 170 illustrated in FIG. 1. Additionally or alternatively, the interface 270 may include, for example, an MHL interface, an SD card/MMC interface, or an IrDA standard interface.

The audio module 280 bi-directionally converts sound and an electric signal. At least one element of the audio module 280 may be included in the input/output interface 150 illustrated in FIG. 1. The audio module 280 processes sound information input or output through the speaker 282, the receiver 284, the earphone 286, or the microphone 288.

The camera module 291 is, for example, a device capable of capturing a still image or a moving image, and according to an embodiment, may include one or more image sensors (e.g., a front sensor or a rear sensor), a lens, an image signal processor (ISP), or a flash (e.g., an LED, a xenon lamp, etc.).

The power management module 295 manages power of the electronic device 201. According to an embodiment, the power management module 295 may include a power management integrated circuit (PMIC), a charger IC, or a battery fuel gauge. The PMIC may have a wired and/or wireless charging scheme. The wireless charging scheme includes a magnetic-resonance type, a magnetic induction type, and an electromagnetic type, and for wireless charging, an additional circuit, for example, a coil loop, a resonance circuit, or a rectifier may be further included. The battery gauge measures the remaining capacity of the battery 296 or the voltage, current, or temperature of the battery 296 during charging. The battery 296 may include a rechargeable battery and/or a solar battery.

The indicator 297 displays a particular state, for example, a booting state, a message state, or a charging state, of the electronic device 201 or a part thereof (e.g., the processor 210). The motor 298 converts an electric signal into mechanical vibration or generates vibration or a haptic effect. Although not shown, the electronic device 201 may include a processing device (e.g., a GPU) for supporting a mobile TV. The processing device for supporting the mobile TV processes media data according to, a standard such as digital multimedia broadcasting (DMB), digital video broadcasting (DVB), or mediaFlo™.

Figure 3:
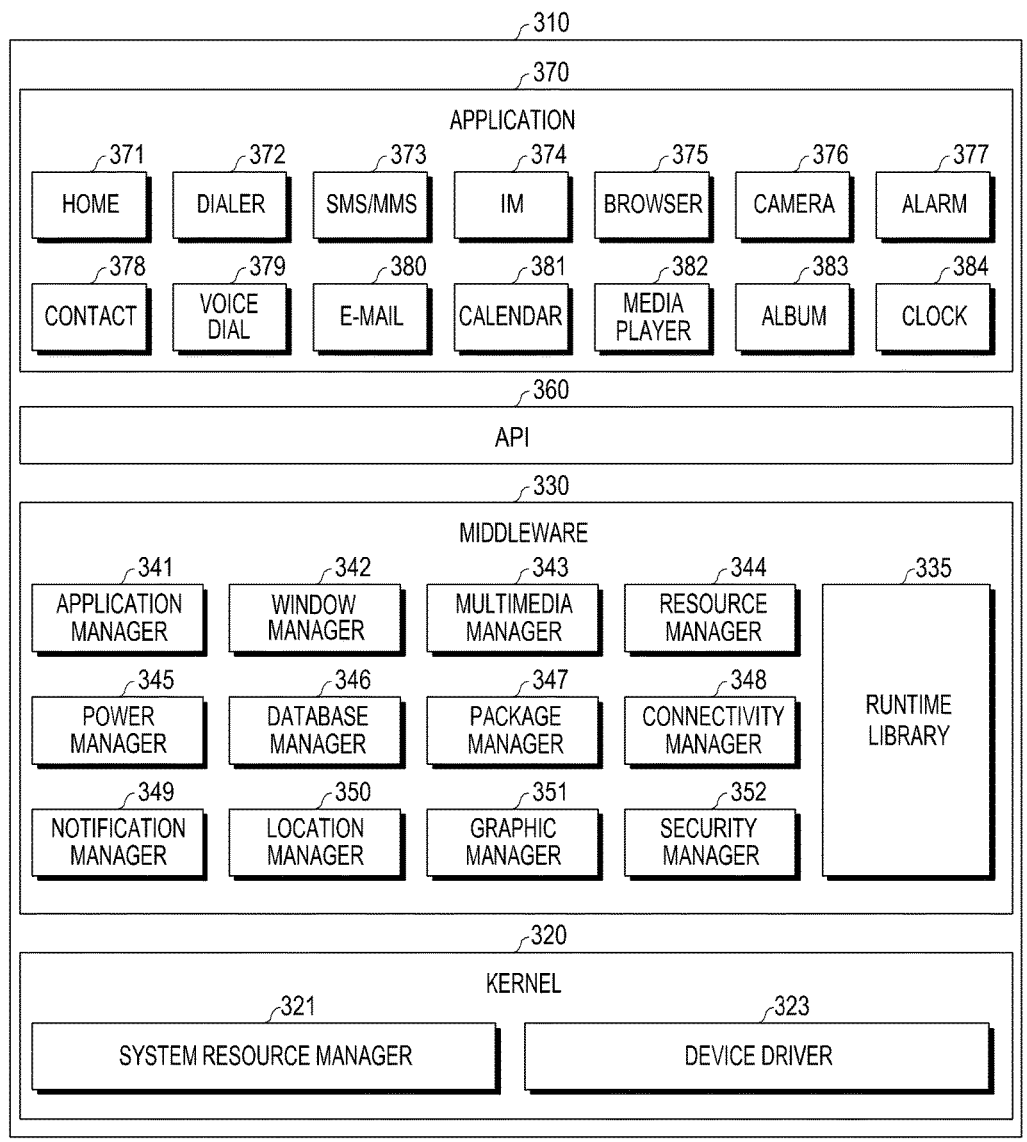
FIG. 3 is a block diagram illustrating an example programming module according to various example embodiments of the present disclosure.

FIG. 3 is a block diagram illustrating an example programming module according to various example embodiments of the present disclosure. According to an example embodiment, a programming module 310 (e.g., the program 140) may include an OS for controlling resources associated with an electronic device (e.g., the electronic device 101) and/or various applications (e.g., the application program 147) executed on the OS. The OS may include Android™, iOS™, Windows™, Symbian™, Tizen™, or Samsung Bada OS™.

The programming module 310 may include, for example, a kernel 320, middleware 330, an application programming interface (API) 360, and/or an application 370. At least a part of the programming module 310 may be preloaded on an electronic device or may be downloaded from an external device (e.g., the electronic device 102 or 104 or the server 106).

The kernel 320 (e.g., the kernel 141) may, for example, include a system resource manager 321 and/or a device driver 323. The system resource manager 321 may perform control, allocation, retrieval of system resources, and so forth. According to an embodiment, the system resource manager 321 may include a process management unit, a memory management unit, or a file system. The device driver 323 may include, for example, a display driver, a camera driver, a Bluetooth driver, a shared memory driver, a USB driver, a keypad driver, a WiFi driver, an audio driver, or an inter-process communication (IPC) driver.

The middleware 330 may include provide functions that the application 370 commonly requires or provide various functions to the application 370 through the API 360 to allow the application 370 to efficiently use a limited system resource in an electronic device. According to an embodiment, the middleware 330 (e.g., the middleware 143) may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352.

The runtime library 335 may include a library module that a compiler uses to add a new function through a programming language while the application 370 is executed. The runtime library 335 performs functions relating to an input/output, memory management, or calculation operation.

The application manager 341 manages a life cycle of at least one application among the applications 370. The window manager 342 manages a GUI resource using a screen. The multimedia manager 343 recognizes a format necessary for playing various media files and performs encoding or decoding on a media file by using a codec appropriate for a corresponding format. The resource manager 344 manages a resource such as source code, memory, or storage space of at least one application among the applications 370.

The power manager 345 manages a battery or power, for example, in operation with a basic input/output system (BIOS) and provides power information necessary for an operation of the electronic device. The database manager 346 performs a management operation to generate, search or change a database used for at least one application among the applications 370. The package manager 347 manages the installation or update of an application distributed in a package file format.

The connectivity manager 348 manages a wireless connection such as a WiFi or Bluetooth connection. The notification manager 349 displays or notifies events such as arrival messages, appointments, and proximity alerts in a manner that is not disruptive to a user. The location manager 350 manages location information of an electronic device. The graphic manager 351 manages a graphic effect to be provided to a user or a user interface relating thereto. The security manager 352 provides a general security function necessary for system security or user authentication. According to an embodiment, if the electronic device (e.g., the electronic device 101) has a call function, the middleware 330 may further include a telephony manager for managing a voice or video call function of the electronic device.

The middleware 330 may include a middleware module forming a combination of various functions of the above-mentioned internal elements. The middleware 330 may provide modules specified according to types of OS so as to provide distinctive functions. Additionally, the middleware 330 may delete some of existing elements or add new elements dynamically.

The API 360 (e.g., the API 145) may be provided as a set of API programming functions with a different configuration according to the OS. In the case of Android or iOS, for example, one API set may be provided by each platform, and in the case of Tizen, two or more API sets may be provided.

The application 370 (e.g., the application program 147) may include one or more applications capable of providing a function, for example, a home application 371, a dialer application 372, a short messaging service/multimedia messaging service (SMS/MMS) application 373, an instant message (IM) application 374, a browser application 375, a camera application 376, an alarm application 377, a contact application 378, a voice dial application 379, an e-mail application 380, a calendar application 381, a media player application 382, an album application 383, a clock application 384, a health care application (e.g., for measuring the amount of exercise or blood sugar level), an application for providing environment information (e.g., for providing air pressure, humidity, or temperature information), and so forth.

According to an embodiment, the application 370 may include an application (hereinafter, an "information exchange application" for convenience) supporting information exchange between the electronic device (e.g., the electronic device 101) and an external electronic device (e.g., the electronic device 102 or 104). The information exchange application may include, for example, a notification relay application for transferring specific information to the external electronic device or a device management application for managing the external electronic device.

For example, the notification relay application may include a function for transferring notification information generated in another application (e.g., an SMS/MMS application, an e-mail application, a health care application, or an environment information application) of the electronic device to an external electronic device (e.g., the electronic device 102 or 104). The notification relay application may receive notification information from an external electronic device to provide the same to a user.

The device management application may manage (e.g., install, remove, or update) at least one function (e.g., turn on/turn off of an external electronic device itself (or a part thereof) or control of brightness (or resolution) of a display) of an external device (e.g., the electronic device 102 or 104) communicating with the electronic device, a service provided by an application operating in an external electronic device or provided by the external electronic device (e.g., a call service or a message service).

According to an embodiment, the application 370 may include an application (e.g., device health care application of mobile medical equipment) designated according to an attribute of the external electronic device (e.g., the electronic device 102 or 104). According to an embodiment, the application 370 may include an application received from the external electronic device (e.g., the server 106 or the electronic device 102 or 104). According to an embodiment, the application 370 may include a preloaded application or a third party application that may be downloaded from the server. Names of elements of the programming module 310 according to the illustrated embodiment may vary depending on a type of an OS.

According to various embodiments, at least a part of the programming module 310 may be implemented by software, firmware, hardware, or a combination of at least two of them. The at least a part of the programming module 310 may be implemented (e.g., executed) by a processor (e.g., the processor 210). The at least a part of the programming module 310 may include, for example, modules, programs, routines, sets of instructions, or processes for performing one or more functions.

The electronic device 101 according to various example embodiments of the present disclosure obtains location collect information associated with location information and transmits location collection data corresponding to the obtained location collect information to another electronic device (e.g., the server 106). Herein, the location collect information may include cellular information at a corresponding location.

For example, the GNSS module 227 (e.g., a GPS module) of the electronic device 101 may obtain location information, and the electronic device 101 (e.g., the processor 120) obtains cellular data through the cellular module 221 of the electronic device 101. The electronic device 101 matches the obtained location information to the cellular information corresponding to the obtained cellular data to generate the location collect information for the current location. If the location of the electronic device 101 is changed, the electronic device 101 obtains the obtained cellular data obtained at the changed location and generates location collect information at a new location. The electronic device 101 generates the location collection data including the collected location collect information in at least one geographic location and transmits the generated location collection data to the server 106. Herein, the location information may be information indicating a geographic location of the electronic device 101, for example, information associated with a location transmitted from a GPS satellite that transmits the location information. In an example embodiment, the location information may include at least one of time information, latitude information, longitude information, and location error information received from the GPS satellite.

The cellular data may include a cellular signal transmitted and received between the electronic device 101 and the base station and data associated with base station information. The cellular data may include information about each of the serving cell and the neighboring cell. Herein, the serving cell information may include a serving cell identifier and serving cell link information. The serving cell identifier may be information given to each cell in a network to identify the serving cell, and may include, for example, a cell ID, band information, etc. The serving cell link information may include instantaneous characteristics of a radio link between the serving cell and the electronic device 101, and may include, for example, a received signal strength, timing advance, and so forth. The neighboring cell information may include a neighboring cell identifier and neighboring cell link information. The neighboring cell identifier may include a portion of information included in the serving cell identifier, and the neighboring cell link information may include a portion of the serving cell link information.

According to an example embodiment, the cellular data may include information about at least one of a received signal strength indicator (RSSI), a reference signal received power (RSRP), reference signal received quality (RSRQ), a signal to noise ratio (SNR), and time advance (TA). The cellular information corresponding to the obtained cellular data may be a cell measurement value. The cellular information may include base station information that may include information about at least one of a national code, a network code, a regional code, the number of frequency channels, base station unique information, and physical base station unique information. Thus, the cellular information may include at least one of a mobile county code (MCC), a mobile network code (MNC), a tracking area code (TAC/LAC), a frequency channel number (EARFCN/ARFCN), a cell ID (ECI), and a physical cell ID (PCI/PSC).

The electronic device 101 according to various example embodiments may obtain cellular data from each of a plurality of base stations as well as a single base station. For example, the electronic device 101 may obtain cellular data from each of the plurality of base stations by communicating with each of the plurality of base stations. In an example embodiment, the electronic device 101 obtains cellular data received from the serving cell and cellular data received from the neighboring cell and matches the cellular data received from each of the serving cell and the neighboring cell to location information to generate the location collect information. Thus, the location collect information may include cellular information about each of the serving cell and the neighboring cell at a current location of the electronic device 101.

This will be described in greater detail below with reference to FIGS. 4 and 5.

Figure 4:
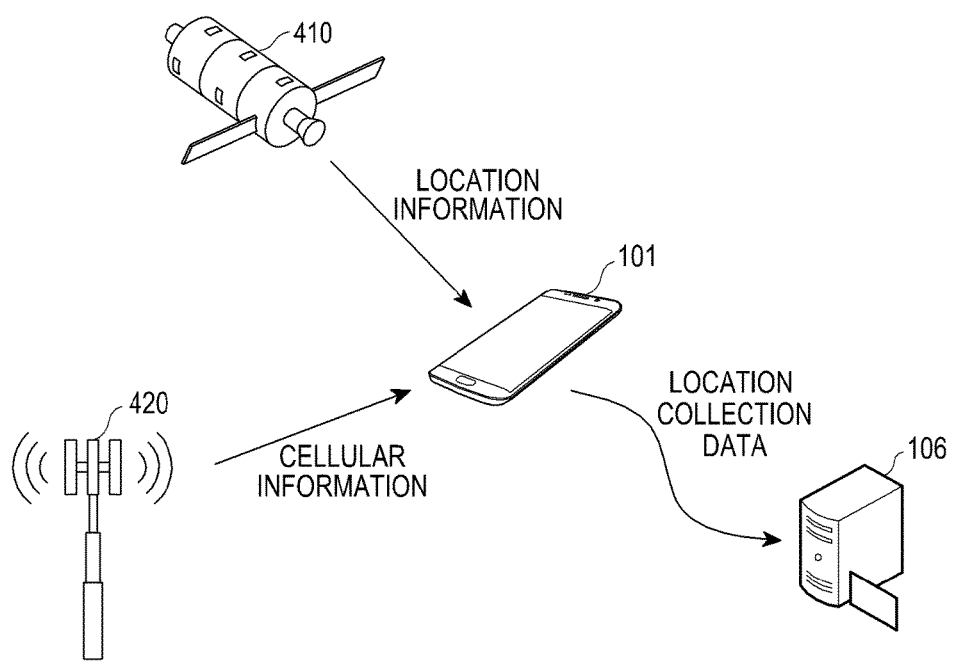
FIG. 4 is a diagram illustrating example location information collection of an electronic device according to various example embodiments of the present disclosure.

FIG. 4 is a diagram illustrating example location information collection of an electronic device according to various example embodiments of the present disclosure.

Referring to FIG. 4, the electronic device 101 obtains location information from, for example, a GPS satellite 410, and obtains cellular information from a base station 420. The electronic device 101 generates location collect information based on cellular information at a current location, e.g., a location where location information is obtained. The electronic device 101 transmits location collection data including the generated location collect information to the server 106. The electronic device 101 transmits location collect information generated at each of a plurality of locations to the server 106 based on a predetermined condition. This will be described in greater detail below.

Figure 5:
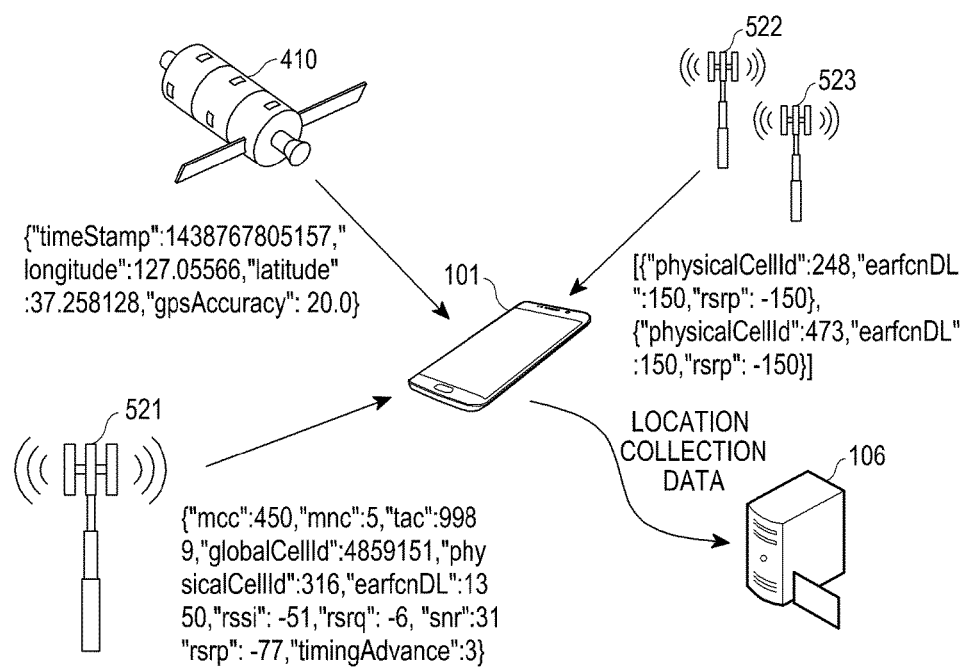
FIG. 5 is an diagram illustrating example location collection information according to various example embodiments of the present disclosure.

FIG. 5 is a diagram illustrating example location collection information according to various example embodiments of the present disclosure.

Referring to FIG. 5, the GNSS module 227 of the electronic device 101 obtains location information from a GPS satellite 410. For example, the GNSS module 227 may obtain a time stamp, longitude information, latitude information and/or GPS accuracy information (or GPS error information) regarding time information. The electronic device 101 obtains cellular information from a first base station 521 corresponding to the serving cell. For example, the cellular module 221 may obtain information about each of MCC, MNC, TAC, cell ID (global cell ID), PCI, EARFCN, RSSI, RSRQ, SNR, RSRP, and TA from a first base station 521 corresponding to the serving cell. The cellular module 221 may obtain information about each of PCI, EARFCN, and RSRP from each of a second base station 522 and a third base station 523 corresponding to a neighboring cell. The electronic device 101 generates location collect information of the current location based on the obtained location information and the obtained cellular information and transmits location collection data including the generated location collect information to the server 106.

For example, as illustrated in FIG. 5, the electronic device 101 may obtain, from the GPS satellite 410, location information including a time stamp of "1438767805157" (e.g., expressed in second units), a latitude of "127.05566 degrees", a longitude of "37.258128 degrees", and a GPS error of "20" (e.g., expressed in meter units). The electronic device 101 may obtain, from the first base station 521 corresponding to the serving cell, cellular information including an MCC of "450", an MNC of "5", a TAC of "9989", a global cell ID of "485951", an EARFCN of "1350", an RSSI of "−51" (e.g., expressed in dBm units), an RSRQ of "−6" (e.g., expressed in dB units), an SNR of "31", an RSRP of "−77", and a TA of "3". The electronic device 101 may obtain cellular data including a PCI of "248", an EARFC of "150", an RSRP of "−150" from the second base station 522 corresponding to the neighboring cell, and cellular data including a PCI of "473", an EARFC of "150", and an RSRP of "−150" from the third base station 523 corresponding to the neighboring cell.

The electronic device 101 according to various example embodiments generates location collect information according to various conditions.

In an example embodiment, the electronic device 101 generates the location collect information if an error of location information obtained by the GNSS module 227 is within a given reference range or greater than a predetermined threshold value. For example, the electronic device 101 may generate the location collect information if location error information of the location information obtained by the GNSS module 227, e.g., GPS accuracy, is within a specific distance.

In another example embodiment, the electronic device 101 generates location collect information when the at least one processor 120 included in the electronic device 101 operates. For example, the electronic device 101 may generate the location collect information when operating to periodically communicate with a base station.

Figure 6:
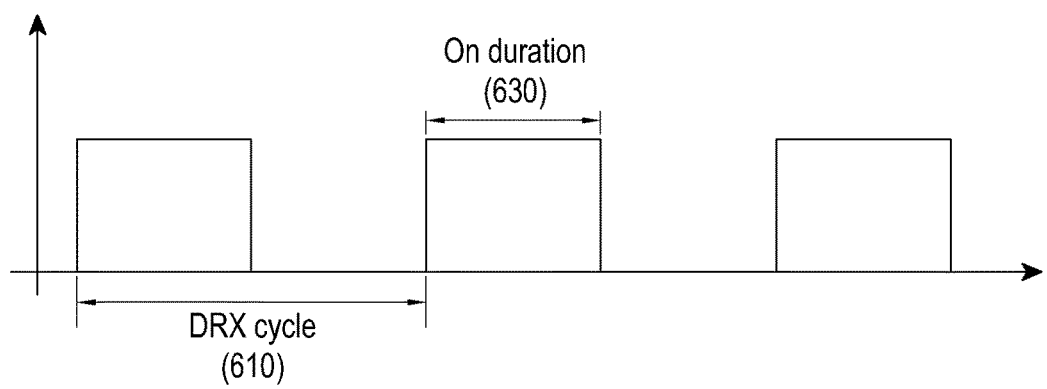
FIG. 6 is a graph illustrating an example discontinuous reception (DRX) cycle according to various example embodiments of the present disclosure.

FIG. 6 is a graph illustrating an example discontinuous reception (DRX) cycle according to various example embodiments of the present disclosure.

Referring to FIG. 6, the electronic device 101 operates according to a DRX cycle 610 that is a cycle for communication with a base station. For example, the electronic device 101 may generate the location collect information during an on-duration 630 of the DRX cycle 610. In another example, the electronic device 101 may determine a location of the electronic device 101 based on cellular data and coverage information obtained during the on-duration 630 of the DRX cycle 610. Determination of the location of the electronic device 101 will be described in greater detail below. Thus, the electronic device 101 may reduce power consumption caused by an operation of generating the location collect information or determining the location of the electronic device 101.

The electronic device 101 according to various example embodiments transmits location collect information generated at various locations to the server 106 at a time, and transmits location collect information collected in a specific environment to the server 106. For example, the electronic device 101 may transmit the collected location collection data to the server 106, when connected to a WiFi network. The electronic device 101 may transmit the collected location collection data to the server 106 only when the remaining battery capacity of the battery 296 is greater than or equal to a specific level or the electronic device 101 is directly connected to a power source, etc.

To obtain cellular data, the electronic device 101 according to various example embodiments obtains cellular information including base station information corresponding to the serving cell of the electronic device 101 and obtains cellular information including base station information corresponding to the neighboring cell. Herein, the serving cell may refer to a cell in which the electronic device 101 is included in an inner coverage of the base station, and the inner coverage may refer to a region in which the electronic device 101 may connect to a cell for communication. The neighboring cell, although not being included in the inner coverage, may refer to a cell in which the electronic device 101 is included in an outer coverage of the base station, and the outer coverage may refer to a region in which the electronic device 101 may receive a signal from a cell without being connected to the cell. This will be described with in greater detail below with reference to FIG. 7.

Figure 7:
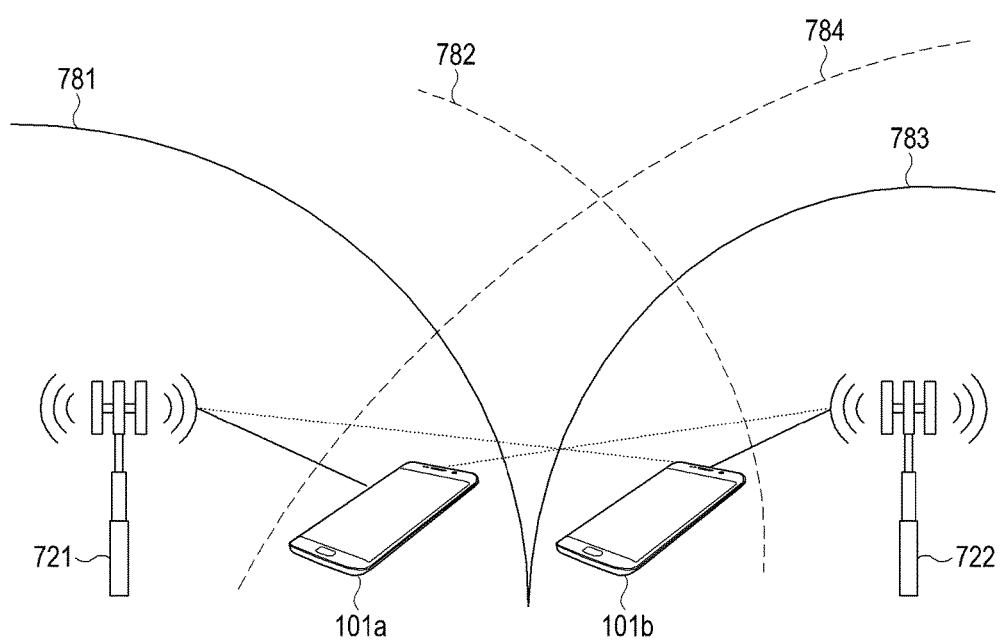
FIG. 7 is a diagram illustrating an example inner coverage and an example outer coverage according to various example embodiments of the present disclosure.

FIG. 7 is a diagram illustrating an example inner coverage and an outer coverage according to various example embodiments of the present disclosure.

Referring to FIG. 7, a first base station 721 connects to and communicates with a first electronic device 101a, which is an electronic device located within an inner coverage 781 of the first base station 721. The first electronic device 101a connects to and communicates with the first base station 721. A first cell corresponding to the first base station 721 may be a serving cell for the first electronic device 101a. The first base station 721 may not connect to and communicate with a second electronic device 101b, which is an electronic device located between the inner coverage 781 and an outer coverage 782, but the second electronic device 101b may receive a signal of the first base station 721. Thus, the first electronic device 101a connects to the first base station 721 and receives a signal from a second base station 722, such that the first electronic device 101a may belong to both the inner coverage 781 of the first base station 721 and an outer coverage 784 of the second base station 722. The second electronic device 101b connects to the second base station 722 and receives a signal from the first base station 721, such that the second electronic device 101b may belong to both the inner coverage 783 of the second base station 722 and the outer coverage 782 of the first base station 721. Meanwhile, one electronic device 101 may belong to an inner coverage of one base station and an outer coverage of a plurality of base stations.

The server 106 according to various example embodiments of the present disclosure may obtain the location collection data from each of the plurality of electronic devices 101. Thus, the server 106 may collect the location collection data for various locations from the plurality of electronic devices 101 through crowd sourcing. The server 106 generates a radio map indicating cellular data corresponding to location information, based on the collected location collection data.

Herein, the radio map may include a coverage map and a transmitter map. The coverage map may refer, for example, to a radio map for a coverage of one cell, and the transmitter map may refer, for example, to a radio map for a location of a transmitter (e.g., a cell tower) that transmits a signal in one cell.

For example, a coverage corresponding to an area where one base station or one cell is served may be mathematically defined as a single closed curve, a probability density function, etc. Thus, the electronic device 101 or the server 106 according to various example embodiments of the present disclosure may form a coverage map using a single closed curve, a probability density function, etc., when forming a coverage map for a coverage. For example, the electronic device 101 or the server 106 may form a coverage using one of a circle, an oval, and a polygon, and may express a coverage as any probability density function defined in a two dimension.

For example, as shown in Table 1, a coverage shape may be formed with various parameters.

TABLE 1

| Coverage Shape | Parameter |
|---|---|
| Circle | Center Coordinates and Radius |
| Oval | Coordinates of Two Focuses and Sum of Distances from Focus |
| Polygon | Coordinates of N Vertexes for N-polygon |
| Normal Distribution | Average and Dispersion (or Standard Deviation) for Latitude and Longitude |

Figure 8:
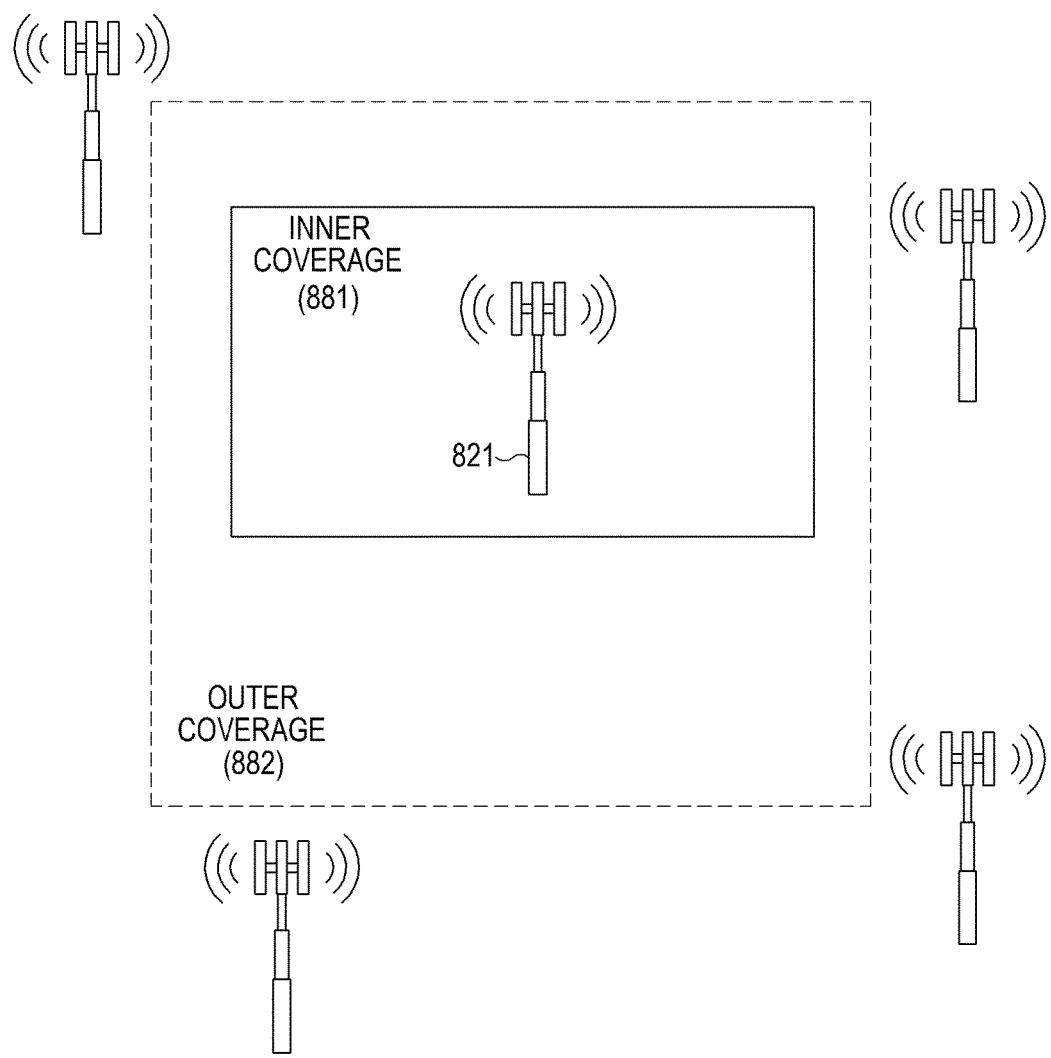
FIG. 8 is a diagram illustrating an example deterministic coverage according to various example embodiments of the present disclosure.

FIG. 8 is a diagram illustrating an example deterministic coverage according to various example embodiments of the present disclosure.

In an example embodiment, the electronic device 101 or the server 106 may form a deterministic coverage. The electronic device 101 or the server 106 mathematically expresses a location distribution corresponding to the collected location collection data as an inside of a single closed curve. The inside of the expressed single closed curve may correspond to the deterministic coverage. The expressed single closed curve may be a minimum enclosing circle/ellipse or a minimum enclosing polygon for location distribution.

Thus, as illustrated in FIG. 8, each of an inner coverage 881 and an outer coverage 882 of a first base station 821 may, for example, be expressed as a single closed curve of a rectangle.

Figure 9:
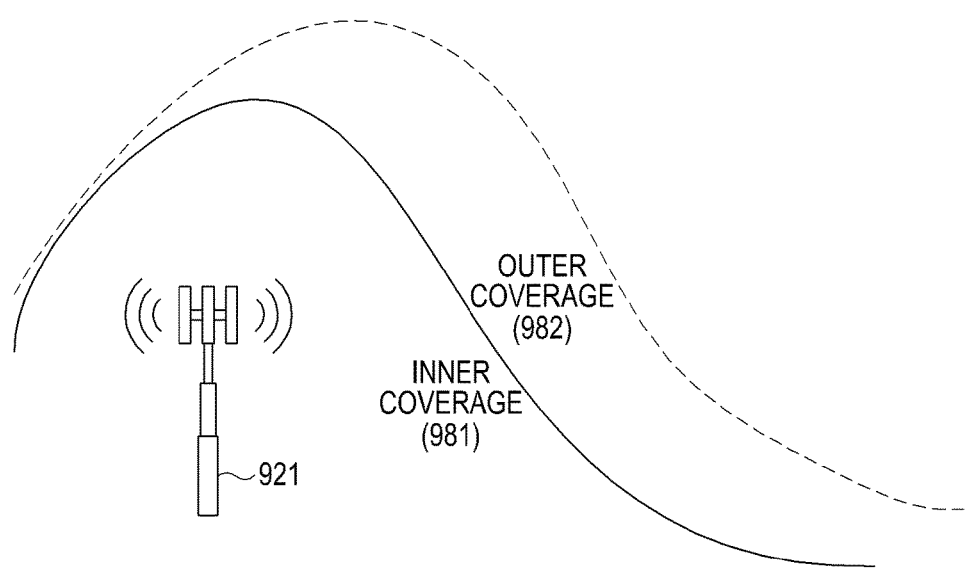
FIG. 9 is a diagram illustrating an example stochastic coverage according to various example embodiments of the present disclosure.

FIG. 9 is a diagram illustrating an example stochastic coverage according to various example embodiments of the present disclosure.

In another example embodiment, the electronic device 101 or the server 106 may form a stochastic coverage. The electronic device 101 or the server 106 mathematically expresses a location distribution corresponding to the collected location collection data as a probability density function. The electronic device 101 or the server 106 may generalize the above-described deterministic coverage to a stochastic coverage. For example, the inner coverage and the outer coverage may be expressed using Equations (1) and (2) below.

$$f_{A,in}(x) = \begin{cases} \frac{1}{|C_{A,in}|} & x \in C_{A,in} \\ 0 & \text{otherwise} \end{cases} \quad (1)$$

where $f_{A,in}(x)$ indicates a probability density function of an inner coverage in a cell A, and $C_{A,in}$ indicates the inner coverage of the cell A. $|C_{A,in}|$ indicates an area of the inner coverage expressed with a single closed curve.

$$f_{A,out}(x) = \begin{cases} \frac{1}{|C_{A,out}|} & x \in C_{A,out} \\ 0 & \text{otherwise} \end{cases} \quad (2)$$

where $f_{A,out}(x)$ indicates a probability density function of an outer coverage in the cell A, and $C_{A,out}$ indicates the outer coverage of the cell A. $|C_{A,out}|$ indicates an area of the outer coverage expressed with the single closed curve.

Thus, as illustrated in FIG. 9, each of an inner coverage 981 and an outer coverage 982 of a first base station 921 may be expressed as a probability density function.

When determining a stochastic coverage, the electronic device 101 or the server 106 may apply a probability density function to $f_{A,in}(x)$ and $f_{A,out}(x)$ of Equation (1) and Equation (2).

An example of a probability density function expressing a coverage C may be a Gaussian probability density function and may be expressed as Equation (3).

$$f_C(x) = \alpha e^{-b(x_1 - \mu_{C,1})^2 - c(x_1 - \mu_{C,1})(x_2 - \mu_{C,2}) - d(x_2 - \mu_{C,2})^2} \quad (3)$$

The electronic device 101 or the server 106 according to various example embodiments may form a transmitter coverage. The transmitter map may refer, for example, to a radio map for a transmitter corresponding to one base station or an antenna of the base station. The transmitter may then configure the transmitter map for coordinates of a location of the transmitter. If there are a plurality of transmitters in one cell, the transmitter map may include a value equaling to the number of plural transmitters in one cell.

The electronic device 101 or the server 106 according to various example embodiments determines the location of the transmitter corresponding to one base station or the antenna of the base station, based on the obtained cellular data.

For example, the electronic device 101 or the server 106 may determine the location of the transmitter based on a rank correlation coefficient. In an example embodiment, the electronic device 101 or the server 106 determines the location of the transmitter by using a rank correlation coefficient between a TA of the transmitter corresponding to the base station or the antenna of the base station and a Euclidean distance (di) in the collected location collection data. The electronic device 101 or the server 106 forms the transmitter map based on the determined location of the transmitter. The electronic device 101 or the server 106 according to various example embodiments determines the location of the transmitter based on various measurement values included in the cellular data as well as the TA.

This will be described in greater detail below with reference to FIG. 10.

Figure 10:
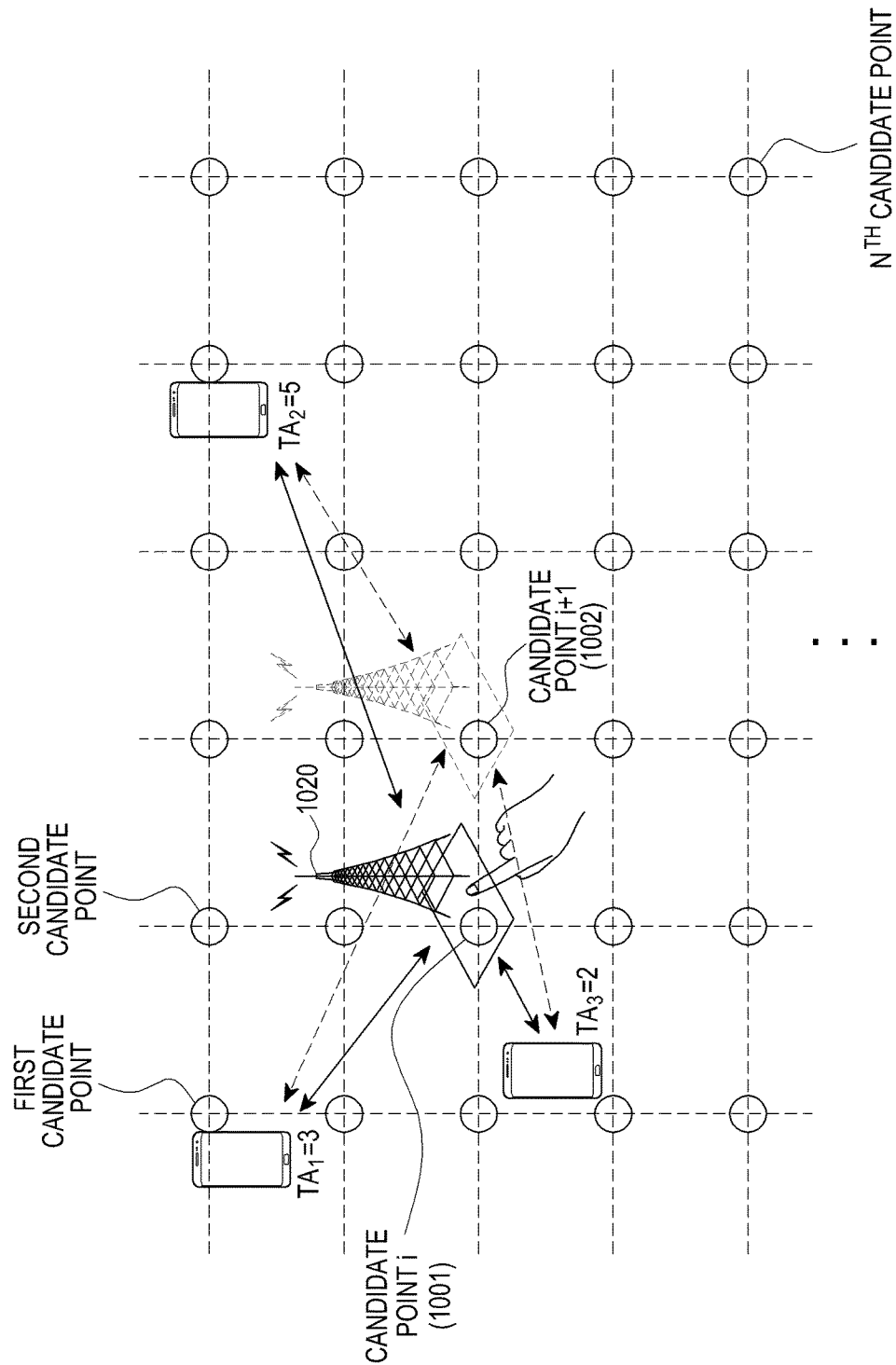
FIG. 10 is a diagram illustrating an example process of determining a transmitter location according to various example embodiments of the present disclosure.

FIG. 10 is a diagram illustrating an example process of determining a transmitter location according to various example embodiments of the present disclosure.

As illustrated in FIG. 10, the electronic device 101 or the server 106 determines whether in each candidate point, e.g., a candidate point i 1001, a correlation coefficient between cellular data based on the obtained location collection data and a location of a transmitter 1020 is maximized.

In an example embodiment, based on Equation (4), the electronic device 101 or the server 106 determines, as the location of the transmitter, a candidate point in which cellular data corresponding to the obtained location collection data, e.g., a rank correlation coefficient between a TA and a distance is maximum. The TA may be smaller as the location of the transmitter is closer.

$$\max_l 1 - \frac{\sum_i |\text{rank}(d_i(l)) - \text{rank}(TA_i)|^2}{n(n^2-1)/6}, \quad (4)$$

where l indicates a location index, n indicates the number of measurement points, $d_i$ indicates a Euclidean distance between the location 1 and the measurement point i, and rank ($TA_i$) indicates a ranking parameter, 1, 2, ..., n.

Referring to Table 2, Equation (4) will be described.

TABLE 2

| | $TA_i$ | rank($TA_i$) | Candidate Point i | Candidate Point i + 1 |
|---|---|---|---|---|
| First Location | $TA_1$ = 3 | 2 | 50(rank = 2) | 100(rank = 3) |
| Second Location | $TA_2$ = 5 | 3 | 90(rank = 3) | 50(rank = 2) |
| Third Location | $TA_3$ = 2 | 1 | 40(rank = 1) | 20(rank = 1) |

Referring to Table 2, according to an order of distances of a first location, a second location, and a third location from the candidate point i, a distance between the third location and a candidate point i 1001 is 40, that is, shortest, such that a rank in the third location may be 1; a distance between the second location and the candidate point i 1001 is longest, such that a rank in the second location may be 3 and a rank in the first location may be 2. Likewise, for a candidate point i+1 1002, a rank in the first location is 3, a rank in the second location is 2, and a rank in the third location is 1.

Thus, a rank in the third location is 1 because of $TA_3$=2 in the third location, a rank in the second location is 3 because of $TA_2$=5 in the second location, and a rank in the first location is 2 because of $TA_1$=3. When the ranks for the candidate point i 1001 are substituted into Equation (4), a result value of Equation (4) may be 1. If a rank difference between each location and candidate points is close to 1, it means that two ranks have a high correlation. According to various example embodiments, the electronic device 101 or the server 106 may determine a candidate point in which the result value of Equation (4) is maximum as the location of the transmitter. The electronic device 101 or the server 106 may indicate the determined location of the transmitter with coordinates and form a transmitter map indicating a location of each of a plurality of transmitters.

The description of formation of the transmitter map is merely a example and the present disclosure is not limited thereto. Thus, the electronic device 101 or the server 106 according to various example embodiments of the present disclosure may form a transmitter map based on various information of cellular data included in collected location information. The electronic device 101 or the server 106 may form the transmitter map by using at least one of RSSI, RSRP, RSRQ, and SNR as well as the above-described TA.

Hereinbelow, formation of the radio map by the server 106 will be described.

The server 106 receives location collection data from the at least one electronic device 101 and matches a cellular value in a location to a latitude and a longitude corresponding to the received location collection data. The server 106 then stores a plurality of collected location collection data to correspond to a latitude and a longitude. The server 106 generates a radio map of raw data for the collected location collection data.

The server 106 stores the plurality of collected location collection data in a quantized grid based on the latitude and the longitude. Thus, a plurality of cell information may be collected in one grid and link information may be stored for each cell.

Figure 11:
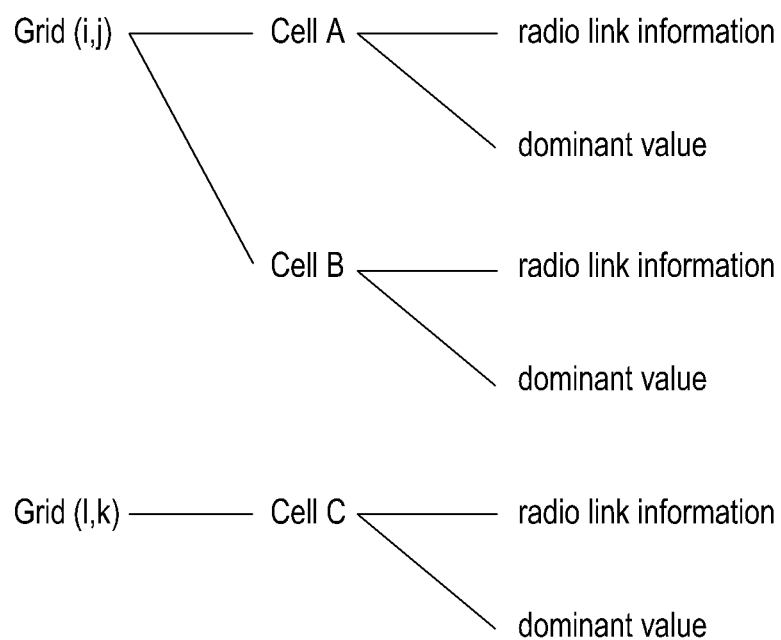
FIG. 11 is a diagram illustrating an example location collection data storage structure according to various example embodiments of the present disclosure.

FIG. 11 is a diagram illustrating an example location collection data storage structure according to various example embodiments of the present disclosure.

Referring to FIG. 11, the server 106 classifies and stores a plurality of collected location collection data by a latitude and a longitude and classifies and stores the location collection data, classified by a latitude and a longitude, by a cell (e.g., a base station). The server 106 classifies and stores the location collection data, classified by a cell, by radio link information and an occupancy rate or dominant value of the cell. The dominant value of the cell may refer, for example, to a rate of location collection data including cellular data with respect to the cell in a corresponding grid.

More specifically, Grid (i,j) and Grid (l,k) indicate coordinates of grids corresponding to latitudes and longitudes, and each of Cell A, Cell B, and Cell C may refer, for example, to one cell or one base station. The grid corresponding to Grid (i,j) may include Cell A and Cell B, and the grid corresponding to Grid (l,k) may include Cell C. Each of Cell A, Cell B, and Cell C may separately store radio link information and a dominant value.

Thus, the server 106 classifies and stores the location collection data, collected for each of Cell A and Cell B included in the grid corresponding to Grid (i,j), by radio link information and a dominant value, and classifies and stores the location collection data, collected for Cell C included in the grid corresponding to Grid (l,k), by radio link information and a dominant value.

Figure 12:
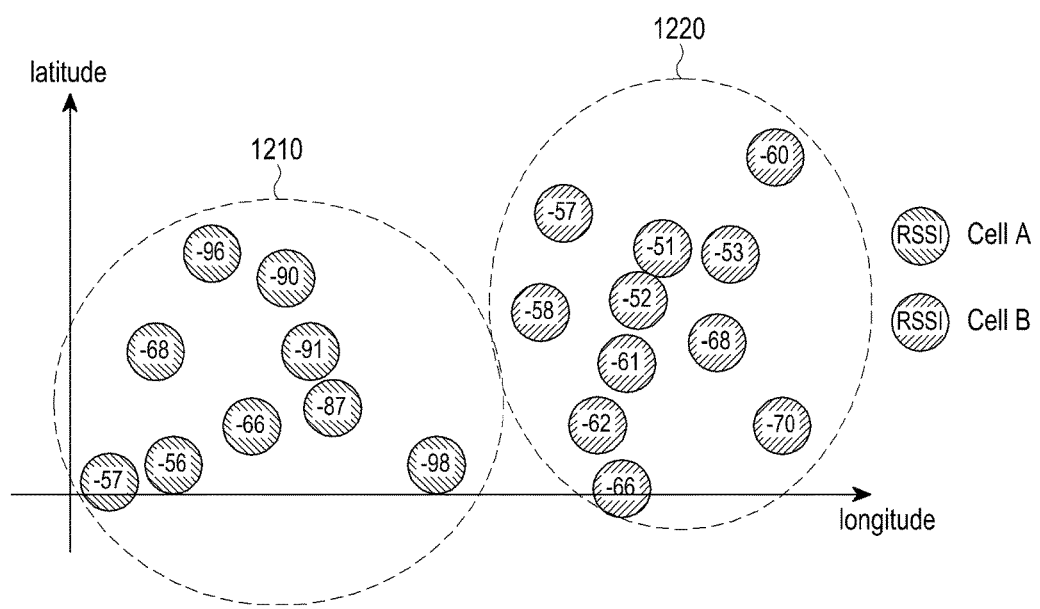
FIG. 12 is a diagram illustrating an example radio map of raw data for location collection information according to various example embodiments of the present disclosure.

FIG. 12 is a diagram illustrating an example radio map of raw data for location collection information according to various example embodiments of the present disclosure.

As illustrated in FIG. 12, the server 106 matches and arranges each of the plurality of collected location collection data to a latitude and a longitude, and stores a radio map of raw data that is the arranged data. Each oval illustrated in FIG. 12 indicates single location collection data, and values expressed in each oval refer, for example, to RSSI values. The raw data of the location collection data may include a collected location, cell data (e.g., an RSSI value) in the location, and cell information (e.g., base station unique information).

Referring to FIG. 12, it can be seen that RSSI values for different cells, Cell A and Cell B, are arranged in regions corresponding to Cell A and Cell B, respectively. RSSI values corresponding to Cell A are arranged in a first region 210 corresponding to Cell A, and RSSI values corresponding to Cell B are arranged in a second region 1220 corresponding to Cell B. Thus, the server 106 may determine that the first region 1210 is associated with Cell A and the second region 1220 is associated with Cell B. The server 106 generates the radio map to be described below, using the location collection data arranged in this way.

The server 106 may perform quantization to a specific region (e.g., a grid) based on the generated radio map of the raw data.

Figure 13A:
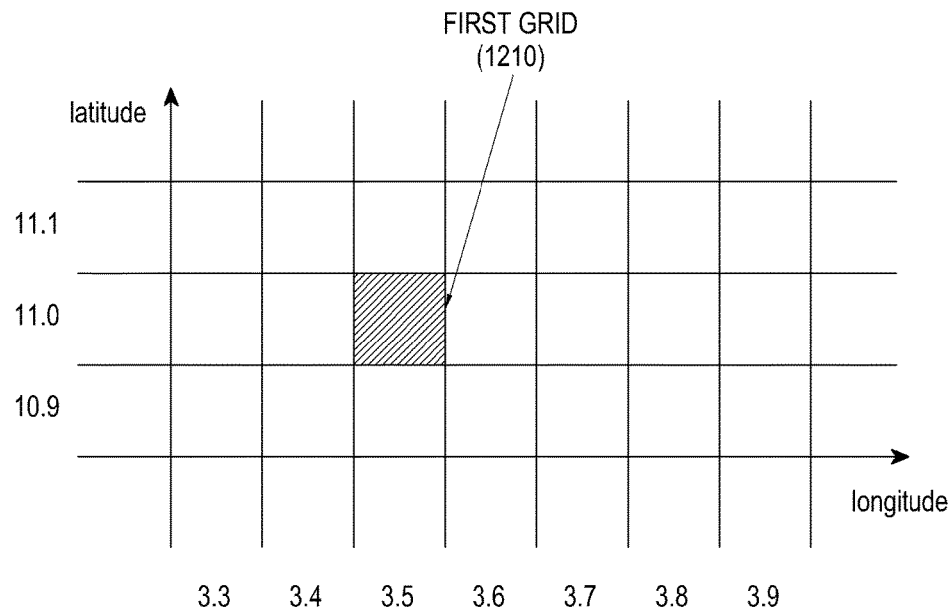
FIG. 13A is a diagram illustrating an example grid of a radio map according to various example embodiments of the present disclosure.

FIG. 13A is a diagram illustrating an example grid of a radio map according to various example embodiments of the present disclosure.

Referring to FIG. 13A, the server 106 divides a geographically specific region into, for example, grids having particular shape and size. Thus, one grid may correspond to coordinates having a latitude and a longitude. In an example embodiment, the first grid 1210 may correspond to coordinates of (3.5, 11.0). The server 106 divides the grid into various sizes and various shapes.

The server 106 stores location collection data corresponding to each of the plurality of divided grids. For example, the server 106 may store location collection data in a grid corresponding to a latitude and a longitude of each collected location collection data. Thus, the server 106 performs quantization that maps the collected location collection data to each of a plurality of grids.

Figure 13B:
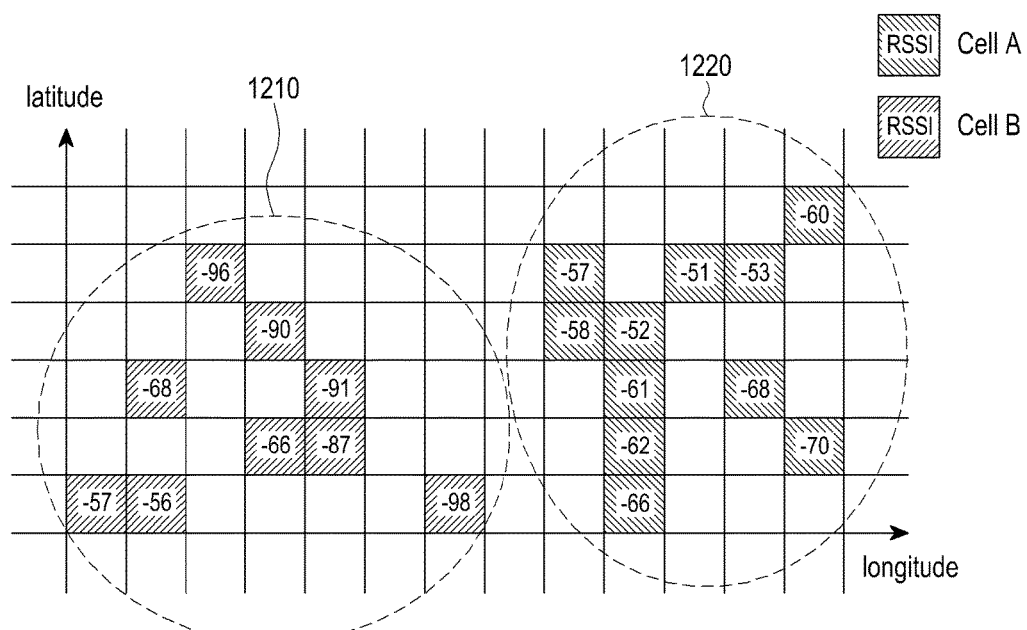
FIG. 13B is a diagram illustrating an example radio map quantized based on a grid according to various example embodiments of the present disclosure.

FIG. 13B is a diagram illustrating an example radio map quantized based on a grid according to various example embodiments of the present disclosure.

Referring to FIG. 13B, the server 106 may map each collected location collection data to a grid corresponding to a latitude and a longitude. When FIGS. 13A and 13B are compared with FIG. 12, it can be seen that each location collection data has been quantized based on a grid. Thus, as described with reference to FIG. 12, in the first region 1210 corresponding to Cell A, each RSSI value corresponding to Cell A may be mapped to a grid corresponding to each RSSI value, and in the second region 1220 corresponding to Cell B, each RSSI value corresponding to Cell B may be mapped to a grid corresponding to each RSSI value.

Meanwhile, a plurality of location collection data may be stored in one grid and location collection data collected from different electronic devices may be stored in one grid.

Upon receiving location collection data corresponding to a particular base station, the server 106 determines a gird corresponding to each location of the received location collection data as an active grid. Cellular data corresponding to one base station may be received by each of a plurality of terminals in a plurality of locations, such that one base station may have a plurality of active grids. Thus, a set of active grids for one base station may correspond to a coverage of the base station.

This will be described in greater detail below with reference to FIG. 14.

Figure 14:
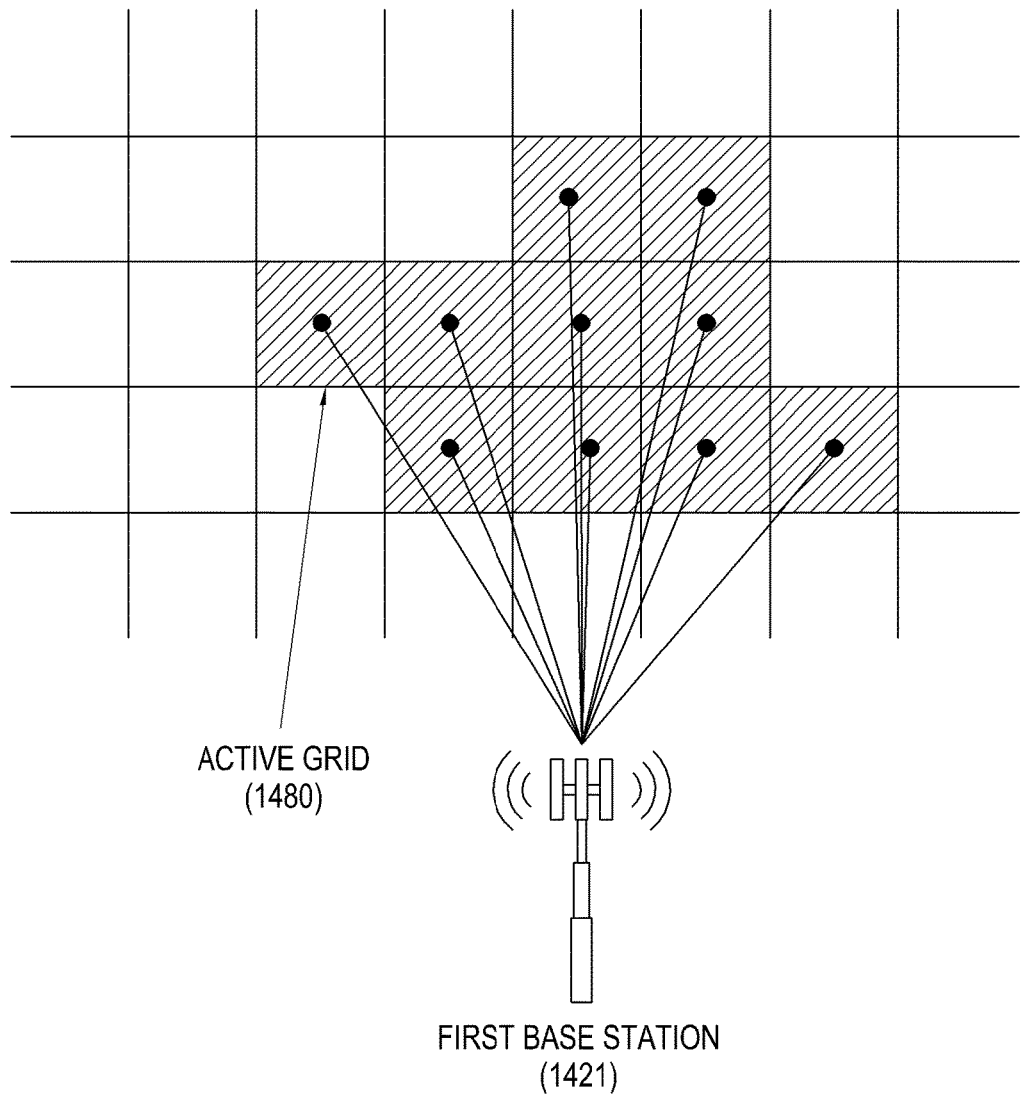
FIG. 14 is a diagram illustrating an example active grid according to various example embodiments of the present disclosure.

FIG. 14 is a diagram illustrating an example active grid according to various example embodiments of the present disclosure.

Referring to FIG. 14, the server 106 determines an active grid 1480, which is a grid corresponding to a location where cellular data corresponding to a first base station 1421 is received, based on collected location collection data. Thus, the active grid 1480 may refer, for example, to a grid in which the electronic device 101 in a location included in the active grid 1480 receives cellular data from the first base station 1421.

The server 106 generates a radio map for divided grids based on a plurality of collected location collection data.

Figure 15:
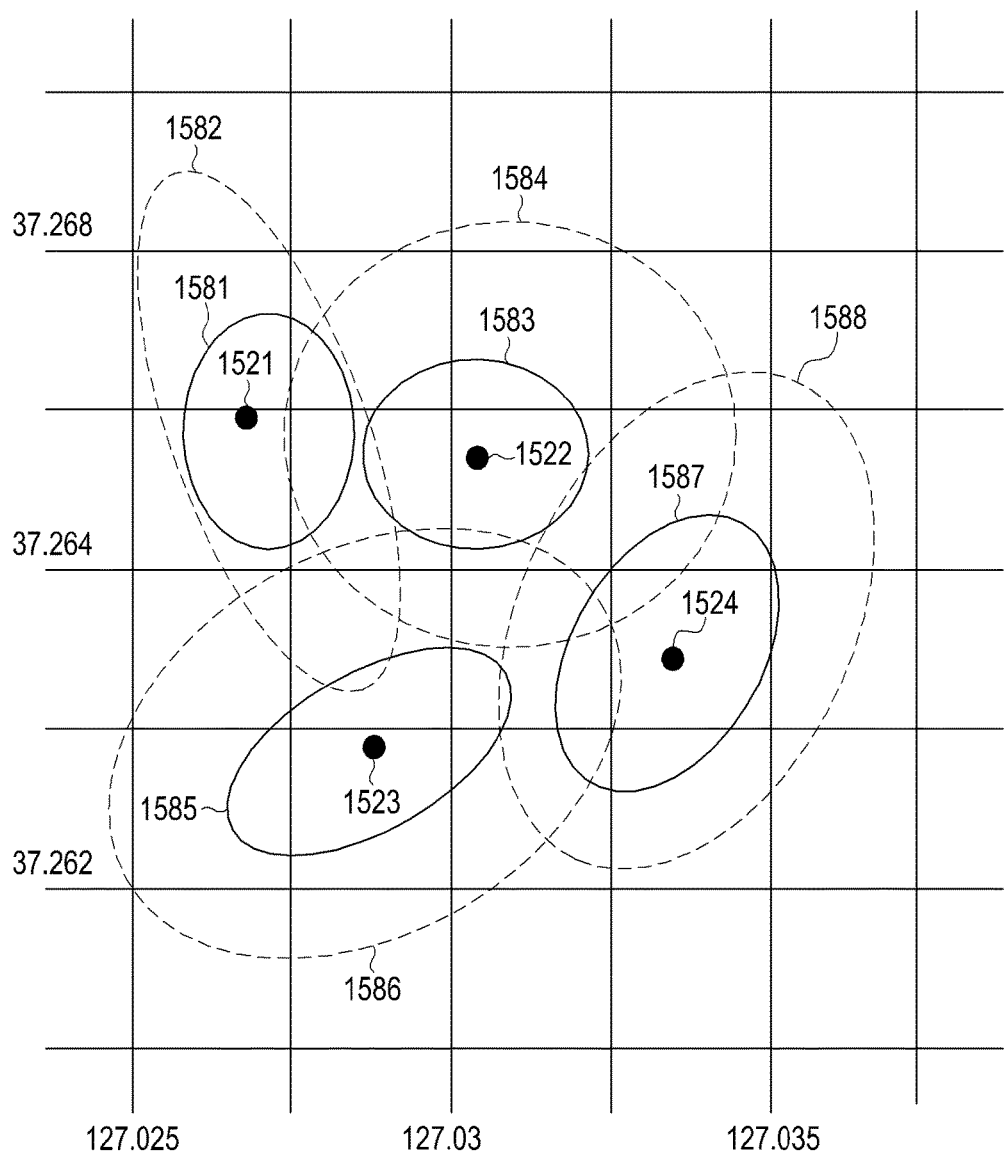
FIG. 15 is a diagram illustrating an example radio map according to various example embodiments of the present disclosure.

FIG. 15 is a diagram illustrating an example radio map according to various example embodiments of the present disclosure.

Referring to FIG. 15, the server 106 generates a coverage map quantized based on a plurality of collected location collection data. In the generated coverage map, an inner coverage and an outer coverage of each of a plurality of base stations may be formed based on a latitude and a longitude on a map divided into a plurality of grids. For example, an inner coverage 1581 and an outer coverage 1582 of a first cell corresponding to a first base station, an inner coverage 1583 and an outer coverage 1584 of a second cell corresponding to a second base station, an inner coverage 1585 and an outer coverage 1586 of a third cell corresponding to a third base station, and an inner coverage 1587 and an outer coverage 1588 of a fourth cell corresponding to a fourth base station may be formed.

The server 106 generates a transmitter map based on a plurality of collected location collection data. In the generated transmitter map, a location of the transmitter may be formed at coordinates on the map divided into a plurality of grids. For example, locations of first coordinates 1521 corresponding to the first base station, second coordinates 1522 corresponding to the second base station, third coordinates 1523 corresponding to the third base station, and fourth coordinates 1524 corresponding to the fourth base station may be indicated.

As illustrated in FIG. 15, the server 106 forms the transmitter map and the coverage map, respectively, to form a radio map including the transmitter map and the coverage map.

The server 106 transmits radio map data for the generated radio map to the electronic device 101. For example, the server 106 may transmit radio map data for a specific region to the electronic device 101.

The server 106 may transmit radio map data for a requested region to the electronic device 101. The server 106 may transmit radio map data to the electronic device 101 according to various shapes or various standards.

The server 106 transmits radio map data for all regions to the electronic device 101 or radio map data for some of the regions to the electronic device 101.

In an example embodiment, the server 106 may receive a patch including radio map data for a particular region from the electronic device 101 or may transmit radio map data corresponding to the requested patch to the electronic device 101. Herein, the patch may include cellular data of a base station corresponding to at least one cell.

The server 106 transmits the coverage map and the transmitter map to the electronic device 101 in a form shown in Table 3. A coverage of the coverage map of Table 3 is assumed to be in an oval form.

TABLE 3

| Cell ID | Coverage Map | Transmitter Map |
|---|---|---|
| First Cell | (37.25, 127.02), (37.26, 127.01), 0.13 | (37.25, 127.02) |
| Second Cell | (36.11, 125.92), (36.11, 125.91), 0.04 | (36.12, 127.91), (36.11, 127.91) |

Referring to Table 3, a coverage map for a first cell may have a shape of an ellipse expressed with a first focus having a latitude and a longitude of (37.25, 127.02), a second focus having a latitude and a longitude of (37.26, 127.01), and a sum of distances from the first focus and the second focus to a point on the ellipse, 0.13. The transmitter map for the first cell may have an oval form with a first mean point having a latitude and a longitude of (37.25, 127.02).

A coverage map for a second cell may have a shape of an ellipse expressed with a third focus having a latitude and a longitude of (36.11, 125.92), a fourth focus having a latitude and a longitude of (36.11, 125.91), and a sum of distances from the third focus and the fourth focus to a point on the ellipse, 0.04. The transmitter map for the second cell may have an oval form with a plurality of mean points, a second mean point having a latitude and a longitude of (37.25, 127.02) and a third mean point having a latitude and a longitude of (36.11, 127.91).

The electronic device 101 determines a current location based on the received radio map data. For example, the electronic device 101 may determine the current location by using received cellular data based on the received radio map data. For example, the electronic device 101 may determine a location corresponding to cellular data for at least one base station received through the cellular module 221 based on the received radio map data and may estimate the determined location as a current location. Thus, the electronic device 101 may estimate the current location of the electronic device 101 without a need to obtain location information through the GNSS module 227.

Figure 16:
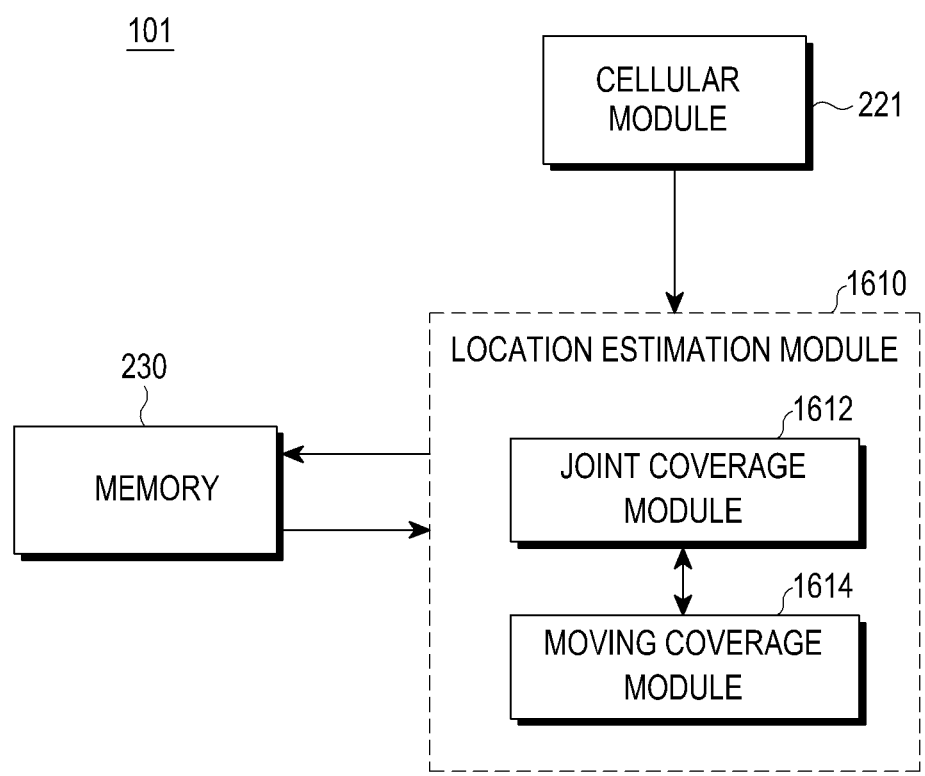
FIG. 16 is a block diagram illustrating an example location determination structure of an electronic device according to various example embodiments of the present disclosure.

FIG. 16 is a block diagram illustrating an example location determination structure of an electronic device according to various example embodiments of the present disclosure.

The electronic device 101 may include the cellular module 221, the memory 230, and/or a location estimation module 1610. The location estimation module 1610 may include a joint coverage module 1612 and/or a moving coverage module 1614. Each of the joint coverage module 1612 and the moving coverage module 1614 may be configured as a module separate from the location estimation module 1610.

The cellular module 221 obtains cellular data from at least one base station. For example, the cellular module 221 may obtain cellular data from each of a base station corresponding to the serving cell and a base station corresponding to the neighboring cell.

The memory 230 may store the radio map data.

The location estimation module 1610 estimates the current location of the electronic device 101. The electronic device 1610 estimates the current location corresponding to obtained cellular data based on the radio map data.

The joint coverage module 1612 included in the location estimation module 1610 determines a joint coverage based on cellular data received from at least one base station. For example, the joint coverage module 1612 may determine a joint coverage based on at least one of an inner coverage and an outer coverage of the serving cell and an inner coverage and an outer coverage of the neighboring cell. For example, the joint coverage module 1612 may determine a joint coverage based on at least one of the inner coverage and the outer coverage of the serving cell and the inner coverage and the outer coverage of the neighboring cell and the location of the transmitter.

The moving coverage module 1614 determines a location or a region predicted according to movement of the electronic device 101.

According to various example embodiments, at least a part of the location estimation module 1610, the joint coverage module 1612, or the moving coverage module 1614 may be implemented by software, firmware, hardware, or a combination of at least two of them. At least a part of the location estimation module 1610, the joint coverage module 1612, or the moving coverage module 1614 may be implemented (e.g., executed) by the at least one processor 120 and 210. At least a part of the location estimation module 1610, the joint coverage module 1612, or the moving coverage module 1614 may include, for example, modules, programs, routines, sets of instructions, or processes.

A portable electronic device according to various example embodiments may include a communication interface comprising communication circuitry and a processor which is configured to identify first cell information corresponding to a serving cell for the portable electronic device and second cell information corresponding to a neighboring cell for the portable electronic device, to transmit the first cell information to an external electronic device using the communication circuitry of the communication interface, to receive first coverage information corresponding to the first cell information, which is determined at least based on the first cell information, and second coverage information corresponding to the second cell information from the external electronic device, and to determine location information corresponding to the portable electronic device at least based on the first coverage information and the second coverage information. The processor may be further configured to identify a moving path of the portable electronic device, to determine third coverage information for the portable electronic device at least based on the moving path, and to determine the location information further based on the third coverage information.

The first coverage information may correspond to the first cell information and third cell information, and processor may be further configured to determine a serving base station, which performs communication connection with the portable electronic device, from among a first base station corresponding to the first cell information and a third base station corresponding to the third cell information, at least based on the first coverage information and the third coverage information.

The processor may be further configured to adjust the first coverage information at least based on a location of the serving base station.

The processor may be further configured to identify a moving direction or a moving speed of the portable electronic device based on at least a part of a moving path of the portable electronic device.

The processor may be further configured to determine location information corresponding to the portable electronic device based on at least one of the first coverage information, the second coverage information, and the identified moving path.

A first coverage may include an inner coverage of the serving cell for the portable electronic device, and a second coverage may include an outer coverage of the neighboring cell for the portable electronic device.

The processor may be further configured to transmit, as at least a part of the first cell information, location information of the portable electronic device, strength information of a signal received from the serving cell, strength information of a signal received from the neighboring cell, or a combination thereof to the external electronic device.

The processor may be further configured to transmit the second cell information to the external electronic device based on the identification of the first cell information and the second cell information using the communication interface.

An electronic device according to various example embodiments may include a cellular module configured to obtain cellular data from at least one base station, a memory, and a processor electrically connected with the memory, in which the memory stores instructions which, when executed, cause the processor to obtain at least one coverage information corresponding to the obtained cellular data and to determine a location of the electronic device based on the obtained at least one coverage information.

The cellular data may include cellular information included in a signal transmitted from at least one base station, and the cellular data may include information about at least one of a received signal strength indicator (RSSI), a reference signal received power (RSRP), reference signal received quality (RSRQ), a signal to noise ratio (SNR), and time advance (TA), and the cellular information may include at least one of a mobile county code (MCC), a mobile network code (MNC), a tracking area code (TAC/LAC), a frequency channel number (EARFCN/ARFCN), a cell ID (ECI), and a physical cell ID (PCI/PSC).

The at least one coverage information may include inner coverage information and outer coverage information of a serving cell and a neighboring cell, respectively, for the electronic device.

The memory may store instructions which, when executed, cause the processor to determine a joint coverage in which the inner coverage of the serving cell and the outer coverage of the neighboring cell are in common, the inner coverage and the outer coverage corresponding to the obtained cellular data.

The memory may store instructions which, when executed cause the processor to determine a stochastic mean point of the determined joint coverage as a location of the electronic device.

The memory may store instructions which, when executed, cause the processor to move the inner coverage of the serving cell to correspond to the determined mean point and to determine the location of the electronic device based on the moved inner coverage of the serving cell, if a received signal strength of a signal corresponding to the serving cell is greater than or equal to a threshold value.

The memory may store instructions which, when executed, cause the processor to determine a joint coverage in which the inner coverage of the serving cell and an inner coverage and the outer coverage of the neighboring cell are in common, if a received signal strength of a signal corresponding to the serving cell is less than a threshold value.

The memory may store instructions which, when executed, cause the processor to determine a moving coverage corresponding to an area predicted along movement of the electronic device, based on mobility of the electronic device.

The memory may store instructions which, when executed, cause the processor to determine the location of the electronic device based on the determined moving coverage and the at least one coverage information.

The memory may store instructions which, when executed, cause the processor to obtain the at least one coverage information based on wireless map data comprising information about a coverage map and information about a transmitter map.

Figure 17:
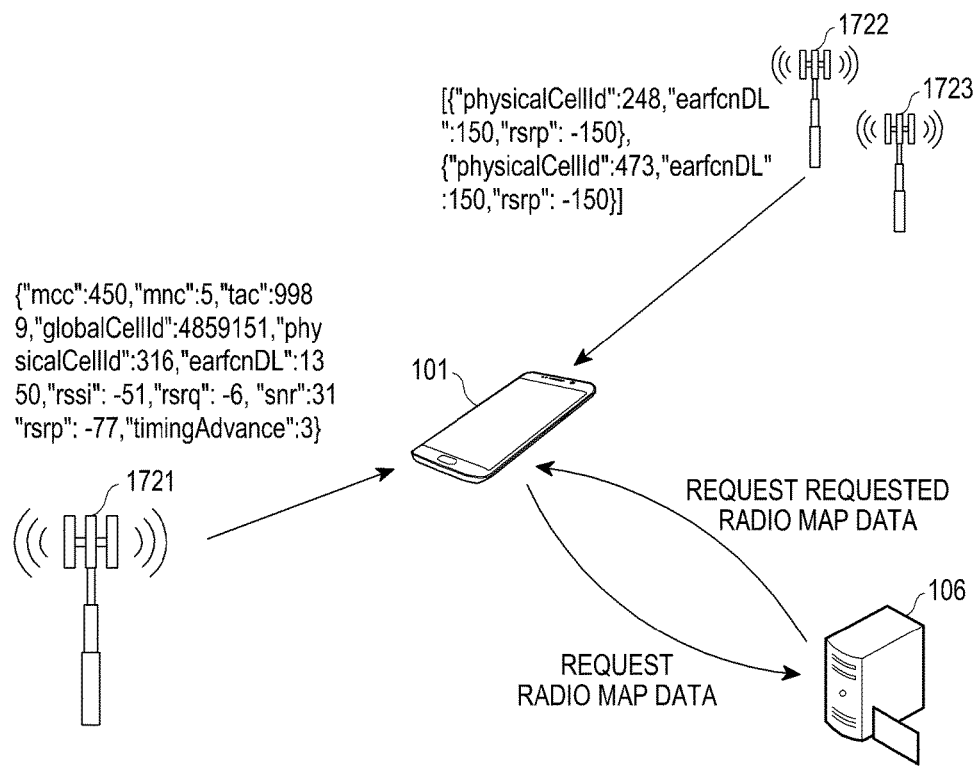
FIG. 17 is a diagram illustrating an example process of obtaining radio map data according to various example embodiments of the present disclosure.

FIG. 17 is a diagram illustrating an example process of obtaining radio map data according to various example embodiments of the present disclosure.

The electronic device 101 obtains cellular data from each of a first base station 1721 corresponding to a serving cell of the electronic device 101, a second base station 1722 corresponding to a neighboring cell, and a third base station 1723 corresponding to the neighboring cell. For example, the cellular module 221 may obtain information about each of MCC, MNC, TAC, cell ID, PCI, EARFCN, RSSI, RSRQ, SNR, RSRP, and TA from the first base station 1721 corresponding to the serving cell. The cellular module 221 may obtain information about each of PCI, EARFCN, and RSRP from each of a second base station 1722 and a third base station 1723 corresponding to the neighboring cell.

For example, as illustrated in FIG. 17, the electronic device 101 may obtain, from the first base station 1721 corresponding to the serving cell, cellular information including an MCC of "450", an MNC of "5", a TAC of "9989", a global cell ID of "485951", a PCI of "316", an EARFC of "1350", an RSSI of "−51", an RSRQ of "−6", an SNR of "31", an RSRP of "−77", and a TA of "3". The electronic device 101 may obtain cellular data including a PCI of "248", an EARFC of "150", an RSRP of "−150" from the second base station 1722 corresponding to the neighboring cell, and cellular data including a PCI of "473", an EARFC of "150", and an RSRP of "−150" from the third base station 1723 corresponding to the neighboring cell.

The processor 120 of the electronic device 101 obtains radio map data corresponding to obtained cellular data. For example, the processor 120 may obtain radio map data corresponding to obtained cellular data from the memory 130. The processor 120 may send a request for radio map corresponding to the obtained cellular data to the server 106 if failing to obtain the radio map data from the memory 130, and may obtain the requested radio map data from the server 106.

The electronic device 101 determines a joint coverage among a plurality of coverages corresponding to the obtained cellular data based on the radio map data, and estimates a joint coverage based on the determined coverage set.

The electronic device 101 may determine the current location using a location of the base station based on the radio map data.

Thus, the electronic device 101 determines the current location based on one or more of the joint coverage and the location of the base station. Herein, a plurality of coverages may include an inner coverage and an outer coverage of the at least one base station or cell.

For example, the electronic device 101 may express a set of a plurality of coverages mathematically as $C = \{C1, C2, \ldots, CN\}$. Herein, a probability density function corresponding to CN is $f_n(x)$, and a probability density function $f_{joint}(x)$ of a joint coverage $C_{joint}$ of a set C is expressed as follows, on the assumption that a probability of belonging to a plurality of coverages is independent:

$$f_{joint}(x) = \frac{1}{a} \prod_{n=1}^{N} f_n(x), \qquad (5)$$

where a indicates a constant value for maintaining a volume of a probability density function as 1.

Figure 18:
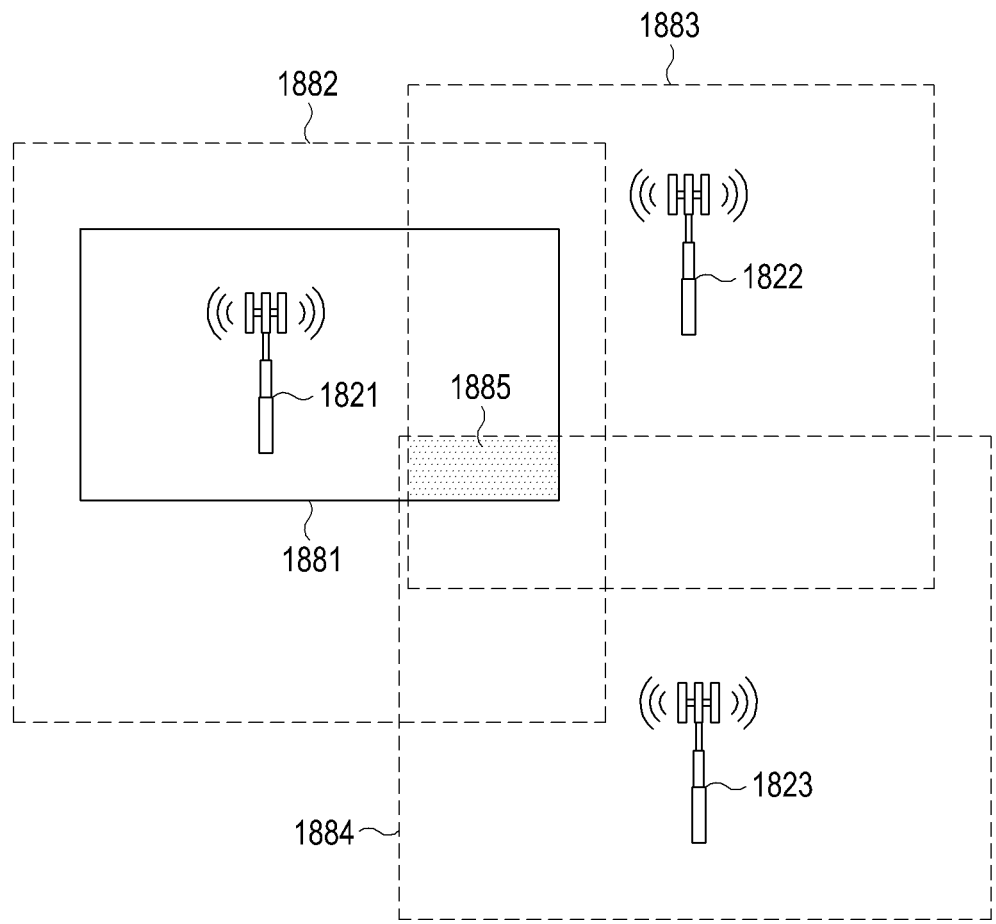
FIG. 18 is a diagram illustrating example joint coverage according to various example embodiments of the present disclosure.

Referring to FIG. 18, the aforementioned joint coverage determination will be described in greater detail.

FIG. 18 is a diagram illustrating example joint coverage according to various example embodiments of the present disclosure.

The electronic device 101 (e.g., the processor 120) obtains cellular data from each of a first base station 1821 corresponding to a serving cell, a second base station 1822 corresponding to a neighboring cell, and a third base station 1823 corresponding to the neighboring cell through the cellular module 221 of the electronic device 101. The processor 120 of the electronic device 101 determines a first inner coverage 1881 and a first outer coverage 1882 of the serving cell based on the cellular data obtained from the first base station 1821 corresponding to the serving cell. The processor 120 determines a second outer coverage 1883 and a third outer coverage 1884 of the neighboring cell based on the cellular data obtained from each of the second base station 1822 and the third base station 1823 corresponding to the neighboring cell. The processor 120 of the electronic device 101 determines a joint coverage 1885 in which the determined inner coverage and outer coverages overlap with each other. Thus, the electronic device 101 may estimate the current location as falling within the joint coverage 1885.

The electronic device 101 according to various example embodiments determines a mean point of the estimated joint coverage as the current location of the electronic device 101.

A mean point $\mu_C=[\mu_{C,1}, \mu_{C,2}]^T$ of a coverage C may be defined as below.

$$\mu_{C,1} = \int_{x_1}\int_{x_2} x_1 f(x) dx_2 dx_2$$

$$\mu_{C,2} = \int_{x_1}\int_{x_2} x_2 f(x) dx_2 dx_2 \quad (6)$$

where $x_1$ and $x_2$ indicate parameters of respective axes, e.g., a latitude and a longitude.

The electronic device 101 use the aforementioned mean point to move the location of the coverage. For example, the electronic device 101 may determine movement of the coverage by moving the mean point of the coverage.

In an example embodiment, if the probability density function of the coverage C is f(x), a moved coverage C($\hat{x}$) that is a result of moving the mean of the coverage C to $\hat{x}$ as follows:

$$f(x+\mu_C-\hat{x}) \quad (7)$$

Where $\mu_C=[\mu_{C,1}, \mu_{C,2}]^T$ indicates coordinates of a latitude and a longitude of the mean point of the coverage C.

The electronic device 101 according to various example embodiments may estimate the current location by using mobility of the electronic device 101. For example, the electronic device 101 may estimate a location of the electronic device 101 based on at least one of a moving direction, a speed, and a velocity of the electronic device 101. A coverage for a location estimated by the electronic device 101 based on mobility of the electronic device 101 is referred to as a moving coverage.

The moving coverage is a coverage for estimating the current location of the electronic device 101 at a specific probability based on mobility information and the past location of the electronic device 101, and as a location estimation error increases, an area or volume of the moving coverage may increase. The moving coverage may be mathematically expressed as $C_{mobi}$, and a probability corresponding to the moving coverage may be expressed as $f_{mobi}(x)$.

Figure 19:
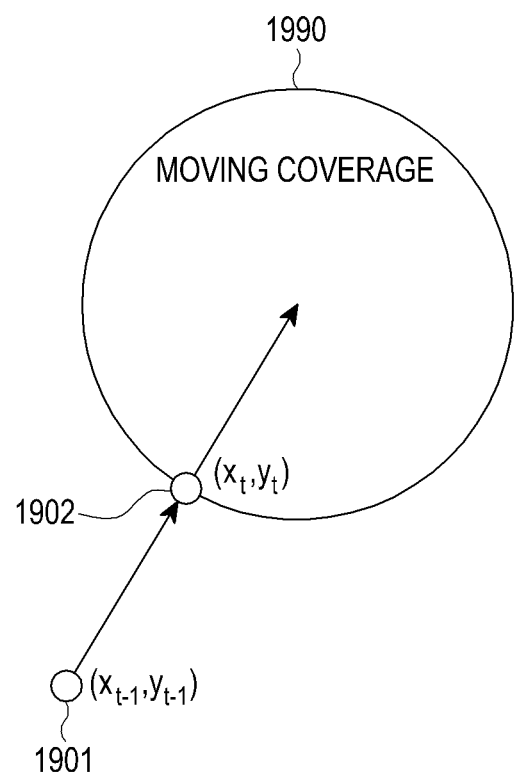
FIG. 19 is a diagram illustrating example moving coverage according to various example embodiments of the present disclosure.

FIG. 19 is a diagram illustrating an example of moving coverage according to various example embodiments of the present disclosure.

The electronic device 101 determines a moving coverage on the assumption that mobility of the electronic device 101 is maintained in a specific time. Referring to FIG. 19, the electronic device 101 is assumed to maintain its movement from a point-in-time (t−1) to a point-in-time t. Herein, a location of the electronic device 101 at the time (t−1) may be a first location 1901 expressed as $(x_{t-1}, y_{t-1})$. A location of the electronic device 101 at the time t may be a second location 1902 expressed as $(x_t, y_t)$. Thus, the electronic device 101 calculates a moving coverage 1990 predicted as the location of the electronic device 101 at a point-in-time (t+1). The calculated moving coverage 1990 may have a circular form having a mean point of $(2x_t-x_{t-1}, 2y_t-y_{t-1})$ and a radius equaling a distance between $(x_{t-1}, y_{t-1})$ and $(x_t, y_t)$.

The electronic device 101 according to various example embodiments determines the current location based on the above-described joint coverage, moving coverage, and transmitter location.

Figure 20A:
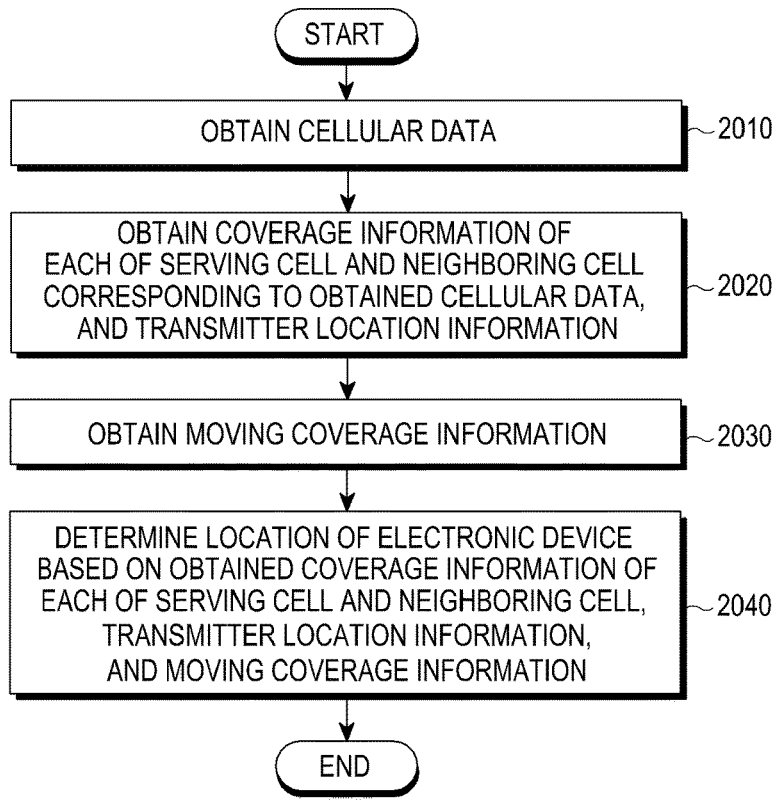
FIGS. 20A and 20B are flowcharts illustrating an example operation of determining a location of an electronic device according to various example embodiments of the present disclosure.

FIG. 20A is a flowchart illustrating an example operation of determining a current location of an electronic device according to various example embodiments of the present disclosure.

In operation 2010, the electronic device 101 (e.g., the processor 120) obtains cellular data from at least one base station through, for example, the cellular data 221 of the electronic device 101. In operation 2020, the processor 120 of the electronic device 101 obtains coverage information for a coverage of each of a serving cell and a neighboring cell corresponding to the obtained cellular data, and transmitter location information. For example, the processor 120 may obtain coverage information from radio map data stored in the memory 130 and may obtain coverage information from radio map data received from the server 106. The processor 120 obtains at least one transmitter location information from the radio map data stored in the memory 130. In operation 2030, the processor 120 of the electronic device 101 obtains moving coverage information for the moving coverage, which is the location estimated based on mobility of the electronic device 101. For example, the moving coverage module 1614 may determine a moving coverage corresponding to a location or a region predicted according to movement of the electronic device 101, based on mobility of the electronic device 101. In operation 2040, the processor 120 of the electronic device 101 determines the location of the electronic device 101 based on the obtained coverage information of each of the serving cell and the neighboring cell, the obtained transmitter location information, and the obtained moving coverage information. The processor 120 determines the joint coverage based on the obtained coverage information of each of the serving cell and the neighboring cell, the obtained transmitter location information, and the obtained moving coverage information and determines the location of the electronic device 101 using the determined joint coverage.

In an embodiment, the electronic device 101 configures the joint coverage, the set C as below.

$$C=\{C_{A,inner}, C_{B,outer}, C_{mobi}\}$$

Herein, $C_{A,inner}$ indicates the inner coverage of the serving cell, $C_{B,outer}$ indicates the outer coverage of the neighboring cell, and $C_{mobi}$ indicates a moving coverage.

Thus, the electronic device 101 determines the joint coverage using a set of the inner coverage and the outer coverage of each of the serving cell and the neighboring cell, and the moving coverage. The electronic device 101 determines the mean point of the determined joint coverage as the current location of the electronic device 101. This has already been described and thus will not be described in detail at this time.

Figure 20B:
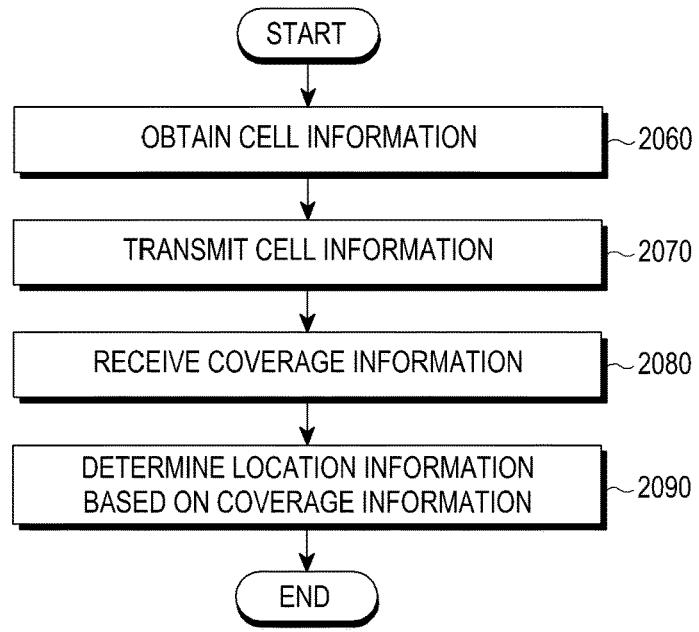

FIG. 20B is a flowchart illustrating an example operation of determining a current location of an electronic device according to various example embodiments of the present disclosure.

In operation 2060, the electronic device 101 (e.g., the processor 120) identifies cell information from at least one base station through, for example, the cellular data 221 of the electronic device 101. Herein, the cell information may refer, for example, to information associated with a cell, e.g., cellular data.

In an embodiment, the electronic device 101 obtains first cell information corresponding to the serving cell and second cell information corresponding to the neighboring cell. The electronic device 101 identifies the obtained first cell information and second cell information.

In operation 2070, the electronic device 101 transmits the first cell information to an external electronic device (e.g., the server 106) by using a communication interface (e.g., the communication module 170).

In operation 2080, the electronic device 101 receives first coverage information corresponding to the first cell information, which is determined at least based on the transmitted first cell information, and second coverage information corresponding to the second cell information, from an external electronic device, e.g., the server 106. Herein, the first coverage information and the second coverage information may be determined based on the first cell information and the second cell information, respectively. A first coverage may include an inner coverage of the serving cell, and a second coverage may include an outer coverage of the neighboring cell. The first coverage information and the second coverage information may include strength information of a signal received from the serving cell and strength information of a signal received from the neighboring cell, respectively, or a combination thereof.

In operation 2090, the electronic device 101 determines location information corresponding to the electronic device 101, at least based on the first coverage information and the second coverage information.

In an example embodiment, the electronic device 101 determines a joint coverage based on the first coverage information and the second coverage information, and determines location information corresponding to the electronic device 101 by using the determined joint coverage.

The electronic device 101 obtains moving coverage information for a moving coverage, which is a third coverage of a location estimated based on mobility of the electronic device 101. In an example embodiment, the electronic device 101 identifies a moving path, a moving direction, and/or a moving speed of the electronic device 101 and determines location information corresponding to the electronic device 101 based on the identified moving path, moving direction, and/or moving speed. This has already been described and thus will not be described in detail here.

Figure 21:
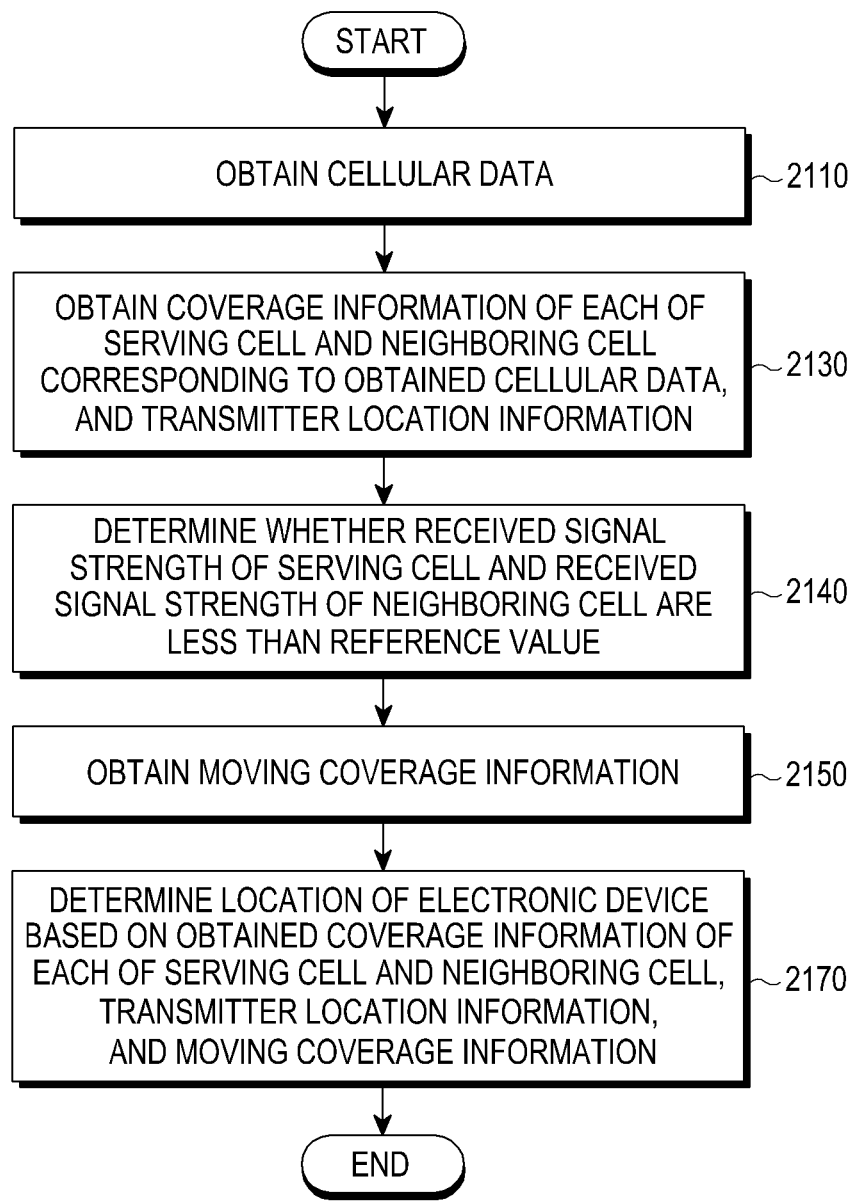
FIG. 21 is a flowchart illustrating an example operation of determining a current location of an electronic device according to various example embodiments of the present disclosure.

FIG. 21 is a flowchart illustrating an example operation of determining a current location of an electronic device according to various example embodiments of the present disclosure.

In operation 2110, the electronic device 101 obtains cellular data from at least one base station. In operation 2130, the processor 120 of the electronic device 101 obtains coverage information for a coverage of each of a serving cell and a neighboring cell corresponding to the obtained cellular data, and transmitter location information. For example, the processor 120 may obtain coverage information from radio map data stored in the memory 130 and may obtain coverage information from received radio map data from the server 106. For example, the processor 120 may obtain the transmitter location information from radio map data stored in the memory 130 and may obtain the transmitter location information from radio map data received from the server 106. In operation 2140, the processor 120 of the electronic device 101 determines based on the obtained cellular data whether a strength of a signal received from a base station corresponding to the serving cell and a signal received from a base station corresponding to the neighboring cell are less than a reference value. In operation 2150, the processor 120 of the electronic device 101 obtains moving coverage information for the moving coverage, which is the location estimated based on mobility of the electronic device 101. For example, the moving coverage calculation module 1614 may determine a moving coverage corresponding to a location or a region predicted based on movement of the electronic device 101, based on mobility of the electronic device 101. In operation 2170, the processor 120 of the electronic device 101 determines the location of the electronic device 101 based on the obtained coverage information of each of the serving cell and the neighboring cell, the obtained transmitter location information, and the obtained moving coverage information. For example, the processor 120 may determine the joint coverage based on the obtained coverage information of each of the serving cell and the neighboring cell and the obtained moving coverage information and may determine the location of the electronic device 101 using the determined joint coverage. If determining that the received signal strengths are less than the reference value in operation 2140, the processor 120 of the electronic device 101 may determine the location of the electronic device 101, further based on the inner coverage information of the neighboring cell when determining the joint coverage for location determination. In an embodiment, the electronic device 101 configures the joint coverage, the set C as below.

$$C=\{C_{A,inner}, C_{B,outer}, C_{mobi}, C_{B,inner}\}$$

Herein, $C_{A,inner}$ indicates the inner coverage of the serving cell, $C_{B,outer}$ indicates the outer coverage of the neighboring cell, $C_{mobi}$ indicates a moving coverage, and $C_{B,inner}$ indicates the inner coverage of the neighboring cell. Thus, the electronic device 101 determines the joint coverage by using a set of the inner coverage and the outer coverage of each of the serving cell and the neighboring cell, and the moving coverage. This will be described with reference to FIG. 22.

Figure 22:
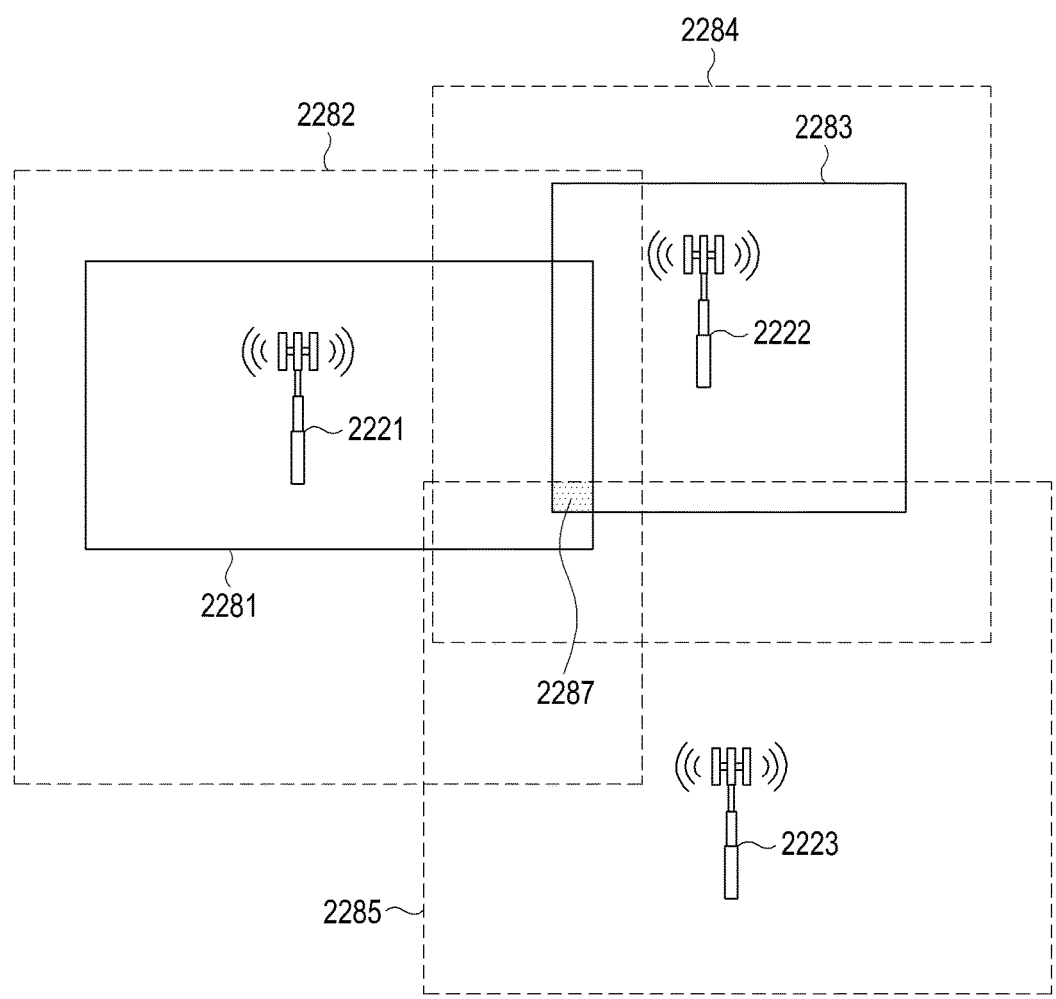
FIG. 22 is a diagram illustrating example joint coverage according to various example embodiments of the present disclosure.

FIG. 22 is a diagram illustrating an example of joint coverage according to various example embodiments of the present disclosure.

The electronic device 101 obtains cellular data from each of a first base station 2221 corresponding to the serving cell, a second base station 2222 corresponding to the neighboring cell, and a third base station 2223 corresponding to the neighboring cell. The processor 120 of the electronic device 101 determines a transmitter location, a first inner coverage 2281, and a first outer coverage 2282 of the serving cell based on the cellular data obtained from the first base station 2221 corresponding to the serving cell. The processor 120 determines transmitter locations, a second inner coverage 2283, a second outer coverage 2284 and a third outer coverage 2285 of the neighboring cells based on the cellular data obtained from each of the second base station 2222 and the third base station 2223 corresponding to the neighboring cells. The processor 120 of the electronic device 101 determines a joint coverage 2287 in which the determined inner coverage and outer coverage overlap with each other. Thus, the electronic device 101 may estimate the current location as falling within the joint coverage 2287. The electronic device 101 may determine (estimate) a more accurate location of the electronic device 101 by using an inner coverage (e.g., the second inner coverage 2283) of the second base station 2222, than when using an outer coverage 2284 of the second base station 2222.

The electronic device 101 determines the mean point of the determined joint coverage as the current location of the electronic device 101. This has already been described and thus will not be described in detail at this time.

The electronic device 101 according to various example embodiments determines the current location of the electronic device 101, when obtaining only the coverage information corresponding to the serving cell.

Figure 23:
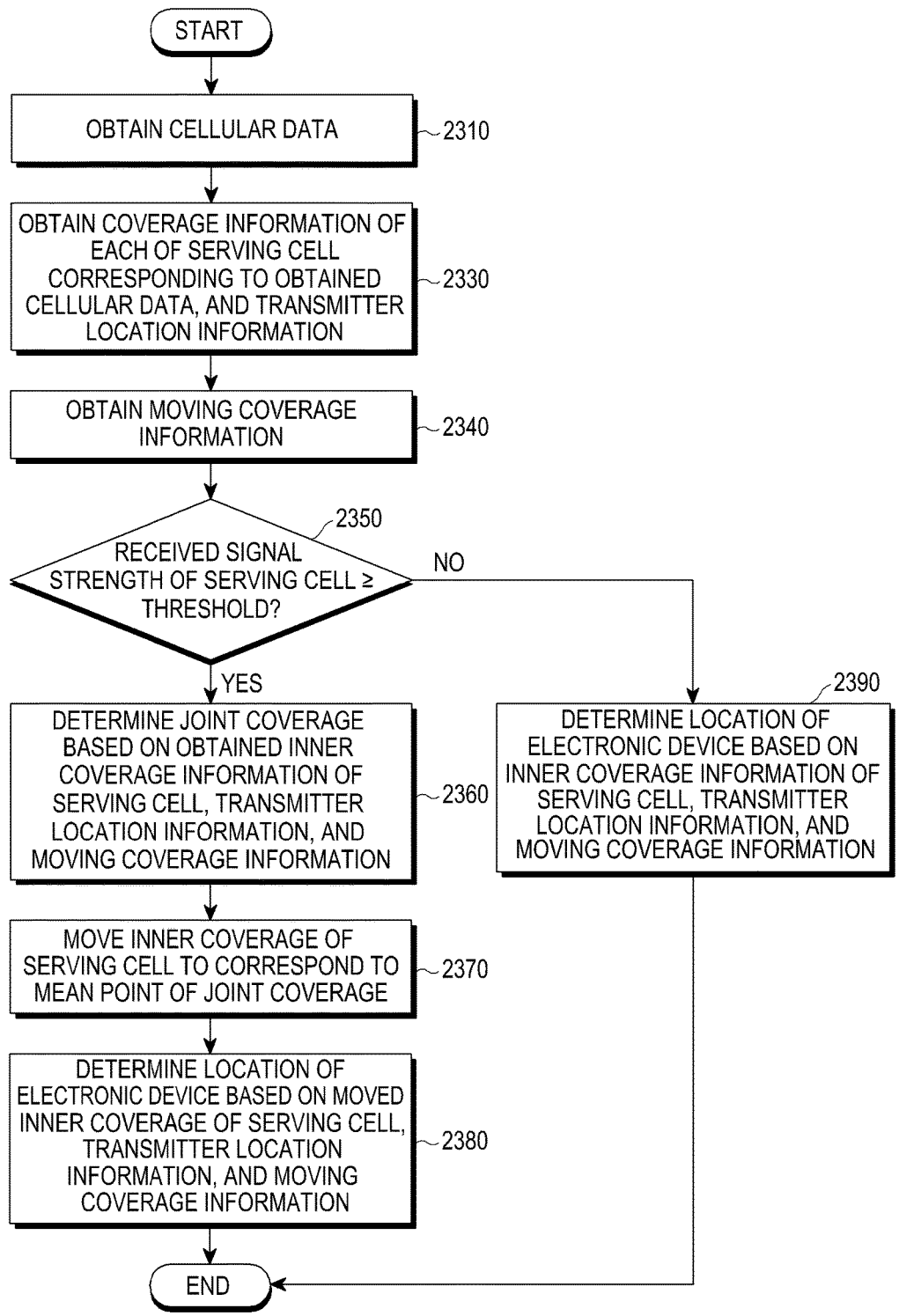
FIG. 23 is a flowchart illustrating an example operation of determining a location of an electronic device according to various example embodiments of the present disclosure.

FIG. 23 is a flowchart illustrating an example operation of determining a location of an electronic device according to various example embodiments of the present disclosure.

In operation 2310, the electronic device 101 obtains cellular data from at least one base station. In operation 2330, the processor 120 of the electronic device 101 obtains coverage information for a coverage of the serving cell corresponding to the obtained cellular data, and transmitter location information. For example, the processor 120 may obtain coverage information and a transmitter location from radio map data stored in the memory 130 and may obtain coverage information and a transmitter location from radio map data received from the server 106. In operation 2340, the processor 120 of the electronic device 101 obtains moving coverage information for the moving coverage, which is the location estimated based on mobility of the electronic device 101. For example, the moving coverage module 1614 may determine a moving coverage corresponding to a location or a region predicted according to movement of the electronic device 101, based on mobility of the electronic device 101. In operation 2350, the processor 120 of the electronic device 101 determines based on the received cellular data whether a strength of a signal received from a base station corresponding to the serving cell is greater than or equal to a threshold value. If determining that the received signal strength is greater than or equal to the threshold value, in operation 2360, the processor 120 of the electronic device 101 determines a joint coverage based on the obtained inner coverage of the serving cell, the transmitter location corresponding to the serving cell, and the moving coverage information. In operation 2370, the processor 120 of the electronic device 101 moves the inner coverage of the serving cell to correspond to a mean point of the joint coverage. For example, the processor 120 of the electronic device 101 may determine a transmitter's location that is closest to the mean point of the determined joint coverage, based on the obtained radio map data, and may move the location of the inner coverage of the serving cell or the location of the transmitter to correspond to the determined location of the transmitter. In operation 2380, the processor 120 of the electronic device 101 determines the location of the electronic device 101 based on the moved inner coverage of the serving cell, the location of the transmitter, and the moving coverage. The processor 120 determines the joint coverage based on the moved inner coverage information of the serving cell, the transmitter's location, and the moving coverage information, and determines the location of the electronic device 101 by using the determined joint coverage. In an embodiment, the electronic device 101 configures the determined joint coverage, the set C as below.

$$C = \{C_{A,inner}(PA, 1), C_{mobi}\}$$

Herein, (PA, 1) may refer to the closest transmitter location. In operation 2390, if determining that the received signal strength of the serving cell is less than the threshold value in operation 2350, the electronic device 101 determines the location of the electronic device 101 based on the inner coverage information of the serving cell, the transmitter location information, and the moving coverage information. This has already been described and thus will not be described in detail here.

Figure 24:
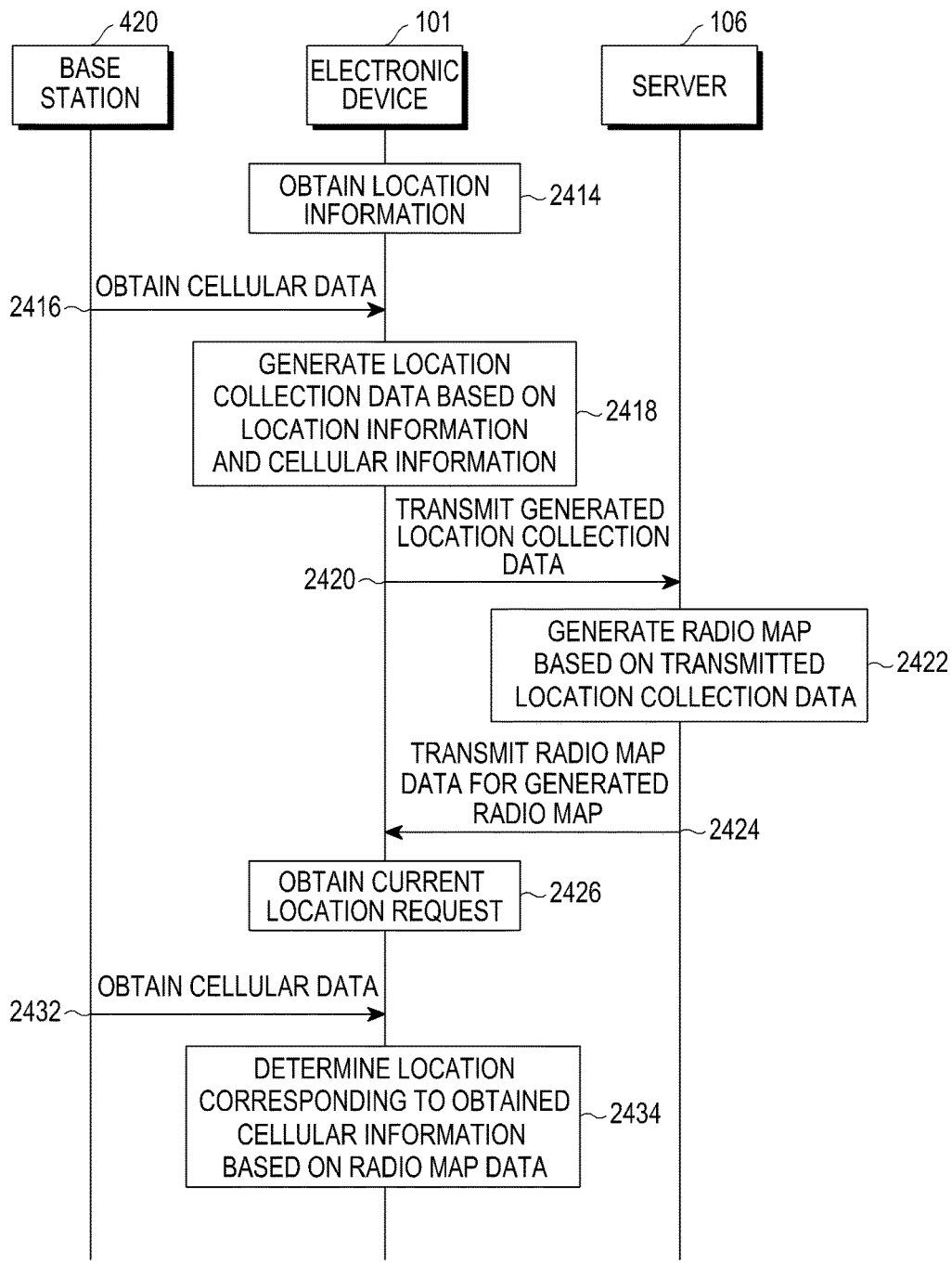
FIG. 24 is a flowchart illustrating an example operation method according to various example embodiments of the present disclosure.

FIG. 24 is a flowchart illustrating an example operation method according to various example embodiments of the present disclosure.

In operation 2414, the electronic device 101, e.g., the GNSS module 227 obtains location information. In operation 2416, the electronic device 101 obtains cellular data including cellular information from the base station 420 through the cellular module 221. In operation 2418, the electronic device 101 generates location collection data based on the obtained location information and cellular information. In operation 2420, the electronic device 101 transmits the generated location collection data to the server 106. In operation 2422, the server 106 generates a radio map based on the transmitted location collection data. For example, the server 106 may generate a radio map including a coverage map and a transmitter map. The server 106 transmits radio map data for the generated radio map to the electronic device 101 in operation 2424. For example, the server 106 may transmit the whole radio map data to the electronic device 101 or a portion of the radio map data to the electronic device 101. In operation 2426, the electronic device 101 obtains a current location request requesting information about a current location. For example, the electronic device 101 may obtain a current location request from the running application 370. In operation 2432, the electronic device 101 obtains cellular data including cellular information from the base station 420 through the cellular module 221. In operation 2434, the electronic device 101 determines a location corresponding to the obtained cellular information based on the radio map data. This has already been described and thus will not be described in detail here.

Figure 25:
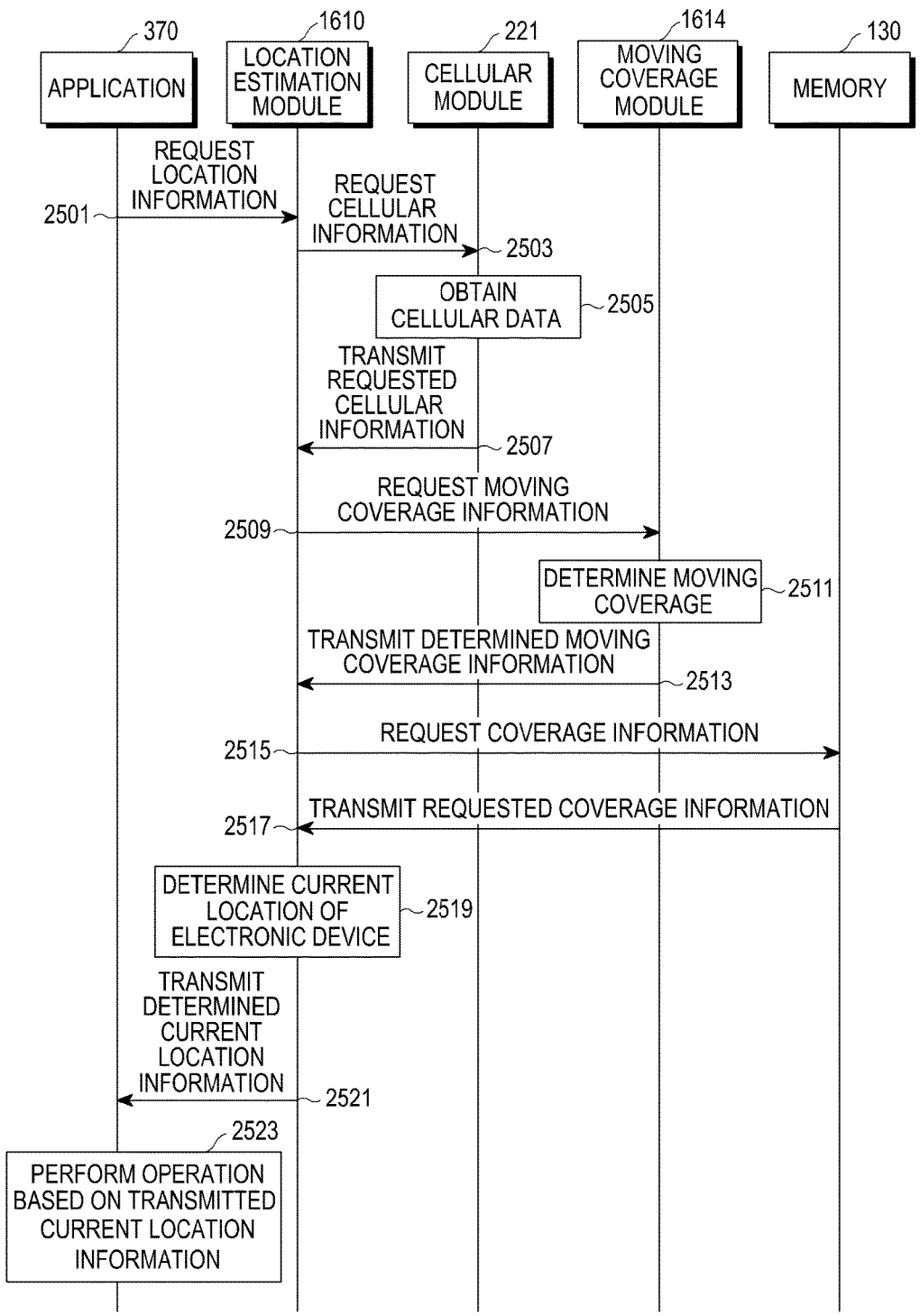
FIG. 25 is a flowchart illustrating an example operation method of an electronic device according to various example embodiments of the present disclosure.

FIG. 25 is a flowchart illustrating an example operation method of an electronic device according to various example embodiments of the present disclosure.

In operation 2501, the electronic device 101 (e.g., the processor 120) sends a location information request to the location estimation module 1610 by using the application 370 included in the electronic device 101. In operation 2503, the location estimation module 1610 sends a request for cellular information to the cellular module 221. In operation 2505, the cellular module 221 obtains cellular data based on a signal received from at least one base station. In operation 2507, the cellular module 221 transmits cellular information included in the obtained cellular data to the location estimation module 1610. In operation 2509, the location estimation module 1610 sends a request for moving coverage information based on mobility of the electronic device 101 to the moving coverage module 1614. In operation 2511, the moving coverage module 1614 determines a moving coverage based on mobility of the electronic device 101. In operation 2513, the moving coverage module 1614 transmits the determined moving coverage information to the location estimation module 1610. In operation 2515, the location estimation module 1610 sends a request for coverage information to the memory 130. The coverage information may include inner coverage information and outer coverage information regarding at least one cell included in a radio map. In operation 2517, the memory 130 transmits the requested coverage information to the location estimation module 1610 based on stored radio map data. In operation 2519, the location estimation module 1610 determines a current location of the electronic device 101 by determining a joint coverage based on at least one of inner coverage information and outer coverage information of at least one cell corresponding to the obtained cellular information, transmitter location information, and the obtained moving coverage information. In operation 2521, the location estimation module 1610 transmits current location information of the determined current location to the application 370. In operation 2523, the application 370 performs an operation based on the transmitted current location information.

Operations (e.g., 2010 to 2040, 2060 to 2090, 2110 to 2170, 2310 to 2390, 2414 to 2434, or 2501 to 2523) described in the processes or methods illustrated in FIGS. 20A through 22 and 23 through 25 may be executed sequentially, in parallel, repeatedly, or heuristically. For example, operations may be performed in different orders, some of them may be omitted, or other operations may be added.

A method in an electronic device according to various example embodiments may include identifying first cell information corresponding to a serving cell for the portable electronic device and second cell information corresponding to a neighboring cell for the portable electronic device, transmitting the first cell information to an external electronic device using the communication interface, receiving first coverage information corresponding to the first cell information, which is determined at least based on the first cell information, and second coverage information corresponding to the second cell information from the external electronic device, and determining location information corresponding to the portable electronic device at least based on the first coverage information and the second coverage information.

The method may further include identifying a moving path of the portable electronic device, to determine third coverage information for the portable electronic device at least based on the moving path, and determining the location information further based on the third coverage information.

The method may further include determining a serving base station, which performs communication connection with the portable electronic device, from among a first base station corresponding to the first cell information and a third base station corresponding to the third cell information, at least based on the first coverage information and the third coverage information.

The method may further include adjusting the first coverage information at least based on a location of the serving base station.

The method may further include identifying a moving direction or a moving speed of the portable electronic device based on at least a part of a moving path of the portable electronic device.

The method may further include determining location information corresponding to the portable electronic device based on at least one of the first coverage information, the second coverage information, and the identified moving path.

A first coverage may include an inner coverage of the serving cell for the portable electronic device, and a second coverage may include an outer coverage of the neighboring cell for the portable electronic device.

The method may further include transmitting, as at least a part of the first cell information, location information of the portable electronic device, strength information of a signal received from the serving cell, strength information of a signal received from the neighboring cell, or a combination thereof to the external electronic device.

The method may further include transmitting the second cell information to the external electronic device based on the identification of the first cell information and the second cell information by using the communication interface.

An operation method of the electronic device according to various example embodiments may include obtaining cellular data from at least one base station, obtaining at least one coverage information corresponding to the obtained cellular data, and determining a location of the electronic device based on the obtained at least one coverage information.

The cellular data may include cellular information included in a signal transmitted from the at least one base station, the cellular data may include information about at least one of a received signal strength indicator (RSSI), a reference signal received power (RSRP), reference signal received quality (RSRQ), a signal to noise ratio (SNR), and time advance (TA), and the cellular information may include at least one of a mobile county code (MCC), a mobile network code (MNC), a tracking area code (TAC/LAC), a frequency channel number (EARFCN/ARFCN), a cell ID (ECI), and a physical cell ID (PCI/PSC).

The at least one coverage information may include inner coverage information and outer coverage information of each of a serving cell and a neighboring cell for the electronic device.

The determining of the location of the electronic device may include determining a joint coverage in which the inner coverage of the serving cell and the outer coverage of the neighboring cell are in common, the inner coverage and the outer coverage corresponding to the obtained cellular data.

The determining of the location of the electronic device may include determining a stochastic mean point of the determined joint coverage as a location of the electronic device.

The determining of the location of the electronic device may include moving the inner coverage of the serving cell to correspond to the determined mean point and determining the location of the electronic device based on the moved inner coverage of the serving cell, if a received signal strength of a signal corresponding to the serving cell is greater than or equal to a threshold value.

The determining of the location of the electronic device may include determining a joint coverage in which the inner coverage of the serving cell and an inner coverage and the outer coverage of the neighboring cell are in common, if a received signal strength of a signal corresponding to the serving cell is less than a threshold value.

The method may further include determining a moving coverage corresponding to an area predicted along movement of the electronic device, based on mobility of the electronic device.

The determining of the location of the electronic device may include determining the location of the electronic device based on the determined moving coverage and the at least one coverage information.

The obtaining of the at least one coverage information may include obtaining the at least one coverage information based on wireless map data comprising information about a coverage map and information about a transmitter map.

Each of the foregoing elements of the electronic device may be configured with one or more components, names of which may vary with a type of the electronic device. In various example embodiments, the electronic device may include at least one of the foregoing elements, some of which may be omitted or to which other elements may be added. In addition, some of the elements of the electronic device according to various example embodiments may be integrated into one entity to perform functions of the corresponding elements in the same manner as before they are integrated.

A term "module" used herein may refer, for example, to a unit including one of or a combination of two or more of hardware, software, and firmware. The "module" may be interchangeably used with a unit, a logic, a logical block, a component, or a circuit. The "module" may be a minimum unit or a portion of an integrated component. The "module" may be a minimum unit or a portion thereof performing one or more functions. The "module" may be implemented mechanically or electronically. For example, the "module" according to the example embodiments may include at least one of a dedicated processor, a CPU, an application-specific integrated circuit (ASIC) chip, field-programmable gate arrays (FPGAs), and a programmable-logic device performing certain operations already known or to be developed.

At least a part of an apparatus (e.g., modules or functions thereof) or a method (e.g., operations) according to various example embodiments may be implemented with a command stored in a computer-readable storage medium in the form of a programming module. When the instructions are executed by one or more processors (for example, the processor 120), the one or more processors may perform functions corresponding to the instructions. The computer-readable storage medium may be, for example, a memory included in the memory 130.

The computer readable recording medium includes hard disk, floppy disk, or magnetic media (e.g., a magnetic tape, optical media (e.g., compact disc read only memory (CD-ROM) or digital versatile disc (DVD), magneto-optical media (e.g., floptical disk), a hardware device (e.g., ROM, RAM, flash memory, etc.), and so forth. Further, the program instructions include a machine language code created by a complier and a high-level language code executable by a computer using an interpreter. The foregoing hardware device may be configured to be operated as at least one software module to perform an operation of the present disclosure, or vice versa.

According to various example embodiments, a storage medium has stored therein instructions which are configured, when executed by at least one processor, to cause the at least one processor to perform at least one operations, in which the at least one operations include, in an electronic device, identifying first cell information corresponding to a serving cell for the portable electronic device and second cell information corresponding to a neighboring cell for the portable electronic device, transmitting the first cell information to an external electronic device using the communication interface, receiving first coverage information corresponding to the first cell information, which is determined at least based on the first cell information, and second coverage information corresponding to the second cell information from the external electronic device, and determining location information corresponding to the portable electronic device at least based on the first coverage information and the second coverage information.

According to various embodiments of the present disclosure, location collection data for cellular information may be collected and provided, thereby generating a radio map used to determine a location based on the cellular information through crowd sourcing.

According to various embodiments of the present disclosure, an accurate location of the electronic device may be determined based on cellular data.

Moreover, according to various embodiments of the present disclosure, a moving coverage based on mobility of the electronic device as well as cellular data may be considered, thereby determining an accurate location of the electronic device.

Modules or programming modules according to various example embodiments of the present disclosure may include one or more of the foregoing elements, have some of the foregoing elements omitted, or further include additional other elements. Operations performed by the modules, the programming modules or other elements according to various embodiments may be executed in a sequential, parallel, repetitive or heuristic manner. Also, some of the operations may be executed in different order or omitted, or may have additional different operations.

The various example embodiments disclosed herein have been provided for description and to aid in understanding of disclosed technical matters, and are not intended to limit the scope of the present disclosure. Therefore, it should be understood that the scope of the present disclosure includes any change or other various example embodiments based on the technical spirit of the present disclosure.

What is claimed is:

1. An electronic device comprising:
a cellular module comprising circuitry configured to obtain first cellular data corresponding to a serving cell from a base station and to obtain at least one second cellular data corresponding to at least one neighbor cell from at least one base station;
a memory; and
a processor electrically connected with the memory,
wherein the memory stores instructions, and the processor is configured to execute the instructions to cause the electronic device to perform operations comprising:
identifying an inner coverage of the serving cell corresponding to the first cellular data and at least one outer coverage of the at least one neighbor cell corresponding to the at least one second cellular data; and
determining a location of the electronic device based on a joint coverage in which the inner coverage of the serving cell and the at least one outer coverage of the at least one neighboring cell are overlapped.

2. The electronic device of claim 1, wherein the cellular data comprises cellular information included in a signal transmitted from the at least one base station, and
the cellular data comprises information regarding at least one of: a received signal strength indicator (RSSI), a reference signal received power (RSRP), reference signal received quality (RSRQ), a signal to noise ratio (SNR), and time advance (TA), and
the cellular information comprises at least one of: a mobile county code (MCC), a mobile network code (MNC), a tracking area code/location area code (TAC/LAC), an E-UTRA absolute radio frequency channel number/absolute radio frequency channel number (EARFCN/ARFCN), an EUTRAN cell ID (ECI), and a physical cell ID /a primary scrambling code (PCI/PSC).

3. The electronic device of claim 2, wherein the operations further comprise determining the joint coverage in which the inner coverage of the serving cell and the at least one outer coverage of the at least one neighboring cell are overlapped.

4. The electronic device of claim 3, wherein the operations further comprise determining a stochastic mean point of the joint coverage as a location of the electronic device.

5. The electronic device of claim 4, wherein the operations further comprise moving the inner coverage of the serving cell to correspond to the determined mean point and to determine the location of the electronic device based on the moved inner coverage of the serving cell, if a received signal strength of a signal corresponding to the serving cell is greater than or equal to a threshold value.

6. The electronic device of claim 4, wherein the operations further comprise determining the joint coverage in which the inner coverage of the serving cell and an inner coverage and an outer coverage of a neighboring cell among the at least one neighboring cell are overlapped, if a difference between a received signal strength of a signal corresponding to the serving cell and a received signal strength of a signal corresponding to the neighboring cell is less than a threshold value.

7. The electronic device of claim 1, wherein the operations further comprise determining a moving coverage corresponding to an area predicted along a movement path of the electronic device, based on mobility of the electronic device.

8. The electronic device of claim 7, wherein the operations further comprise determining the location of the electronic device based on the determined moving coverage, the inner coverage of the serving cell, and the at least one outer coverage of the at least one neighbor cell.

9. The electronic device of claim 1, wherein the operations further comprise obtaining the inner coverage of the serving cell and the at least one outer coverage of the at least one neighbor cell based on wireless map data comprising information regarding a coverage map and information regarding a transmitter map.

* * * * *